United States Patent
Ohtachi et al.

(10) Patent No.: US 6,806,606 B2
(45) Date of Patent: Oct. 19, 2004

(54) MAGNETIC BEARING DEVICE WITH VIBRATION RESTRAINING FUNCTION, MAGNETIC BEARING DEVICE WITH VIBRATION ESTIMATING FUNCTION, AND PUMP DEVICE WITH THE MAGNETIC BEARING DEVICES MOUNTED THERETO

(75) Inventors: Yoshinobu Ohtachi, Narashino (JP); Hideo Fukami, Narashino (JP); Hirotaka Namiki, Narashino (JP)

(73) Assignee: BOC Edwards Technologies Limited, Narashino (JP)

( * ) Notice: Subject to any disclaimer, the term of this patent is extended or adjusted under 35 U.S.C. 154(b) by 0 days.

(21) Appl. No.: 10/651,518

(22) Filed: Aug. 29, 2003

(65) Prior Publication Data

US 2004/0041478 A1 Mar. 4, 2004

(30) Foreign Application Priority Data

Sep. 3, 2002 (JP) ........................................ 2002-257538

(51) Int. Cl.⁷ ................................................ H02K 7/09
(52) U.S. Cl. ...................... 310/90.5; 318/114; 318/128; 318/649; 417/423.7; 417/423.12
(58) Field of Search ......................... 310/90.5; 318/114, 318/128, 649, 460, 629, 646, 661, 665, 632, 628; 417/423.7, 423.12, 356, 420; 361/144–147

(56) References Cited

U.S. PATENT DOCUMENTS

| | | | | |
|---|---|---|---|---|
| 4,626,754 A | * | 12/1986 | Habermann et al. | 318/460 |
| 4,999,534 A | * | 3/1991 | Andrianos | 310/90.5 |
| 5,306,975 A | * | 4/1994 | Bichler | 310/90.5 |
| 5,576,587 A | * | 11/1996 | Takahashi et al. | 310/90.5 |
| 6,394,769 B1 | * | 5/2002 | Bearnson et al. | 417/423.7 |
| 6,595,762 B2 | * | 7/2003 | Khanwilkar et al. | 417/423.7 |

FOREIGN PATENT DOCUMENTS

JP 2003166554 * 6/2003

* cited by examiner

*Primary Examiner*—Tran N. Nguyen
(74) *Attorney, Agent, or Firm*—Adams & Wilks

(57) ABSTRACT

Disclosed are a magnetic bearing device with a vibration restraining function, a magnetic bearing device with a vibration estimating function, and a pump device with the magnetic bearing devices mounted thereto, in which it is possible to realize a reduction in vibration in the apparatus system as a whole inclusive of the equipment associated with the vacuum pump without newly providing a vibration sensor. In a vibration detector, a multiplication result obtained by multiplying the Laplace transformation of a displacement of a rotor by a predetermined transfer function is added to a multiplication result obtained by multiplying the Laplace transformation of a variation in an unbalance force acting on the rotor by the reciprocal of the mass of the rotor. The result of this calculation is reversed in polarity and is added to the output of a compensator by an adder.

48 Claims, 11 Drawing Sheets

MAGNETIC BEARING DEVICE WITH VIBRATION RESTRAINING FUNCTION, MAGNETIC BEARING DEVICE WITH VIBRATION ESTIMATING FUNCTION, AND PUMP DEVICE WITH THE MAGNETIC BEARING DEVICES MOUNTED THERETO

BACKGROUND OF THE INVENTION

1. Field of the Invention

The present invention relates to a magnetic bearing device with a vibration restraining function, a magnetic bearing device with a vibration estimating function, and a pump device with the magnetic bearing devices mounted thereto. More specifically, the invention relates to a magnetic bearing device with a vibration restraining function, a magnetic bearing device with a vibration estimating function, and a pump device with the magnetic bearing devices mounted thereto, in which it is possible to realize a reduction in vibration in the apparatus system as a whole inclusive of the equipment associated with the vacuum pump without newly providing a vibration sensor.

2. Description of the Related Art

With the recent years' development of electronics, there is a rapidly increasing demand for semiconductors for forming memories, integrated circuits, etc.

Such semiconductors are manufactured, for example, by doping a semiconductor substrate of a very high purity with impurities to impart electrical properties thereto, or by stacking together semiconductor substrates with minute circuit patterns formed thereon.

The operation of manufacturing such semiconductors must be conducted in a high vacuum chamber in order to avoid the influences of dust, etc. in the air. This chamber is generally evacuated by a vacuum pump. In particular, a turbo-molecular pump, which is a kind of vacuum pump, is widely used since it entails little residual gas and is easy of maintenance.

A semiconductor manufacturing process includes a number of steps in which various process gases are caused to act on a semiconductor substrate, and the turbo-molecular pump is used not only to evacuate the chamber but also to discharge these process gases from the chamber.

Further, in an apparatus like an electron microscope, an turbo-molecular pump is used to create a high vacuum state in the chamber of the apparatus in order to prevent refraction, etc. of an electron beam due to the presence of dust or the like.

Such a turbo-molecular pump is composed of a turbo-molecular pump main body for sucking and discharging gas form the chamber of a semiconductor manufacturing apparatus, and electron microscope, or the like, and a control device for controlling the turbo-molecular pump main body.

FIG. 10 is a longitudinal sectional view of a turbo-molecular pump main body, and FIG. 11 is a schematic diagram showing an apparatus system as a whole in which the turbo-molecular pump main body is used to evacuate a chamber.

In FIG. 10, a turbo-molecular pump main body 100 includes an outer cylinder 127, on top of which there is formed an intake hole 101. Provided inside the outer cylinder 127 is a rotor 103 having in its periphery a plurality of rotary blades 102a, 102b, 102c, ... serving as turbine blades for sucking and discharging gas and formed radially in a number of stages.

At the center of the rotor 103, there is mounted a rotor shaft 113, which is supported in a levitating state and controlled in position, for example, by a so-called 5-axis control magnetic bearing.

Upper radial electromagnets 104 consist of four electromagnets arranged in pairs in X- and Y-axis directions, perpendicular to each other, and opposed to each other with the rotor shaft 113 therebetween. It is to be assumed that the X- and Y-axes are in a plane perpendicular to the axis of the rotor shaft 113 when the rotor shaft 113 is at a control target position of the magnetic bearing. Further, there is provided an upper radial sensor 107 consisting of four coils wound around cores and arranged in close proximity to and in correspondence with the upper radial electromagnets 104. The upper radial sensor 107 detects radial displacement of the rotor 103, transmitting a detection signal to a control device 200 shown in FIG. 11.

The control device 200 is equipped with magnetic bearing feedback control means composed of a compensator 201, an amplifier 202, etc. In this control device 200, excitation of the upper radial electromagnets 104 is controlled by the output of the amplifier 202 supplied through the compensator 201 having a PID adjusting function, on the basis of a displacement signal detected by the upper radial sensor 107, thus performing adjustment of the radial position of the upper portion of the rotor shaft 113.

The rotor shaft 113 is formed of a high-magnetic-permeability material (e.g., iron) and is adapted to be attracted by the magnetic force of the upper radial electromagnets 104. Such adjustment is conducted independently in the X-axis direction and the Y-axis direction.

Further, lower radial electromagnets 105 and a lower radial sensor 108 are arranged in the same way as the upper radial electromagnets 104 and the upper radial sensor 107. Like the radial position of the upper portion of the rotor shaft 113, the radial position of the lower portion of the rotor shaft 113 is adjusted by the magnetic bearing feedback control means in the control device 200.

Further, axial electromagnets 106A and 106B are arranged respectively on the upper and lower sides of a metal disc 111 provided in the lower portion of the rotor shaft 113. The metal disc 111 is formed of a high-magnetic-permeability material, such as iron. To detect axial displacement of the rotor 103, there is provided an axial sensor 109, which transmits an axial displacement signal to the control device 200.

The axial electromagnets 106A and 106B are excitation-controlled by the output of the amplifier 202 supplied through the compensator 201, which has a PID adjusting function, of the control device 200, on the basis of the axial displacement signal. The axial electromagnet 106A magnetically attracts the metal disc 111 upwardly, and the axial electromagnet 106B magnetically attracts the metal disc 111 downwardly.

In this way, in the control device 200, the magnetic force the axial electromagnets 106A and 106B exert on the metal disc 111 is appropriately controlled by the magnetic bearing feedback control means, magnetically levitating the rotor shaft 113 in the axial direction and retaining it in the space in a non-contact state.

A motor 121 is equipped with a plurality of magnetic poles consisting of permanent magnets arranged circumferentially on the rotor side so as to surround the rotor shaft 113. A torque component for rotating the rotor shaft 113 is imparted to these permanent magnet magnetic poles from the electromagnets on the stator side of the motor 121, thereby rotating the rotor 103.

Further, an RPM sensor and a motor temperature sensor (not shown) are mounted to the motor 121, and the rotation of the rotor shaft 113 is controlled in the control device 200 in response to detection signals from the RPM sensor and the motor temperature sensor.

A plurality of stationary blades 123a, 123b, 123c, ... are arranged so as to be spaced apart from the rotary blades 102a, 102b, 102c, ... by small gaps. In order to downwardly transfer the molecules of exhaust gas through collision, the rotary blades 102a, 102b, 102c, ... are inclined by a predetermined angle with respect to a plane perpendicular to the axis of the rotor shaft 113.

Similarly, the stationary blades 123 are also inclined by a predetermined angle with respect to a plane perpendicular to the axis of the rotor shaft 113, and extend toward the inner side of the outer cylinder 127 to be arranged alternately with the rotary blades 102.

The stationary blades 123 are supported at one end by being inserted into gaps between a plurality of stationary blade spacers 125a, 125b, 125c, ... stacked together in stages.

The stationary blade spacers 125 are ring-shaped members, which are formed of a metal, such as aluminum, iron, stainless steel, or copper, or an alloy containing such metal as a component.

In the outer periphery of the stationary blade spacers 125, the outer cylinder 127 is secured in position with a small gap therebetween. At the bottom of the outer cylinder 127, there is arranged a base portion 129, and a threaded spacer 131 is arranged between the lowermost one of the stationary blade spacers 125 and the base portion 129.

In the portion of the base portion 129 below the threaded spacer 131, there is formed a discharge outlet 133. Connected to the discharge outlet 133 is a dry-sealed vacuum pump passage (not shown), and the discharge outlet 133 is connected to a dry-sealed vacuum pump (not shown) through this dry-sealed vacuum pump passage.

The threaded spacer 131 is a cylindrical member formed of a metal, such as aluminum, copper, stainless steel, or iron, or an alloy containing such metal as a component, and has a plurality of spiral thread grooves 131a in its inner peripheral surface.

The spiral direction of the thread grooves 131a is determined such that when the molecules of the exhaust gas move in the rotating direction of the rotor 103, these molecules are transferred toward the discharge outlet 133.

Connected to the lowermost one of the rotary blades 102a, 102b, 102c, ... of the rotor 103 is a cylindrical portion 102d, which extends vertically downwards. The outer peripheral surface of this cylindrical portion 102d sticks out toward the inner peripheral surface of the threaded spacer 131, and is in close proximity to the inner peripheral surface of the threaded spacer 131 with a predetermined gap therebetween.

The base portion 129 is a disc-like member constituting the base of the turbo-molecular pump main body 100, and is generally formed of a metal, such as iron, aluminum, or stainless steel. The base portion 129 physically retains the turbo-molecular pump main body 100, and also functions as a heat conduction passage. Thus, the base portion 129 is preferably formed of a metal that is rigid and of high heat conductivity, such as iron, aluminum, or copper.

Further, connected to the base portion 129 is a connector 160, to which is connected a signal line between the turbo-molecular pump main body 100 and the control device 200.

In the above-described construction, when the rotary blades 102 are driven and rotated by the motor 121 together with the rotor shaft 113, an exhaust gas from a chamber 300 shown in FIG. 11 is sucked in through the intake hole 101, due to the action of the rotary blades 102 and the stationary blades 123.

The exhaust gas sucked in through the intake hole 101 passes between the rotary blades 102 and the stationary blades 123, and is transferred to the base portion 129. The exhaust gas transferred to the base portion 129 is sent to the discharge outlet 133 while being guided by the thread grooves 131a of the threaded spacer 131.

Further, in order to prevent the exhaust gas sucked in through the intake hole 101 from entering the electrical portion composed of the motor 121, the upper radial electromagnets 104, the upper radial sensor 107, the lower radial electromagnets 105, the lower radial sensor 108, etc., the electrical portion is covered with a stator column 122, and the interior of this electrical portion is maintained at a predetermined pressure with a purge gas.

For this purpose, the base portion 129 is equipped with piping (not shown), and the purge gas is introduced through the piping. The purge gas introduced is passed through the gap between a protective bearing 120 and the rotor shaft 113, the gap between the rotor and stator of the motor 121, and the gap between the stator column 122 and the rotary blades 102 before it is transmitted to the discharge outlet 133.

The turbo-molecular pump main body 100 requires identification of the model and control based on individually adjusted specific parameters (e.g., characteristics corresponding to the model). To store the control parameters, the turbo-molecular pump main body 100 contains an electronic circuit portion 141. The electronic circuit portion 141 is composed of a semiconductor memory, such as EEP-ROM, electronic parts, such as semiconductor devices for access to the semiconductor memory, a substrate 143 for mounting these components thereto, etc.

This electronic circuit portion 141 is accommodated under an RPM sensor (not shown) near the center of the base portion 129 constituting the lower portion of the turbo-molecular pump main body 100, and is closed by a hermetic bottom cover 145.

Incidentally, a reduction in vibration is required of the turbo-molecular pump main body 100, which is used for the chamber 300 of a semiconductor manufacturing apparatus, an electron microscope, or the like.

For example, when vibration is generated in the chamber 300 of the semiconductor manufacturing apparatus during exposure of a circuit pattern, misregistration with a lower circuit pattern will occur, making it impossible to perform normal circuit operation.

Further, in the case of the chamber 300 of the electron microscope also, upon generation of vibration while an object is being observed, the object will be out of focus, resulting in image disturbance.

In view of this, as shown in FIG. 11, the turbo-molecular pump main body 100 is suspended from the chamber 300 through the intermediation of a pump damper 301.

The pump damper 301 shown in FIG. 11 is equipped with a bellows 302, around the outer periphery of which a rubber member 306 is wrapped. Between the turbo-molecular pump main body 100 and the chamber 300, the vibration due to the rotation of the rotor 103 is absorbed. One end of the bellows 302 is fastened to the chamber 300 through the intermediation of a flange (not shown), and the other end thereof is fastened to the intake hole 101 of the turbo-molecular pump main body 100 through the intermediation of a flange 303.

Further, the chamber 300 is supported by a frame 402 arranged on a floor 400, and a device damper 401 is provided between the chamber 300 and the frame 402.

Like the pump damper 301, this device damper 401 also absorbs vibration between the frame 402 and the chamber 300.

In the above-described construction, even if vibration is generated in the turbo-molecular pump main body 100, the vibration is absorbed by the pump damper 301, so that it is not easily transmitted to the chamber 300.

Further, vibration generated from the floor 400 is similarly absorbed by the device damper 401, and is not easily transmitted to the chamber 300.

In this way, a reduction in vibration is achieved for the chamber 300.

However, in the case of vibration damping with such a mechanical damper, there is a problem in that it is rather difficult to achieve a satisfactory vibration damping effect, in particular, in the low-frequency band, for a vibration transmitted through the turbo-molecular pump main body 100 and the frame 402.

Thus, a plurality of pump dampers 301 and a plurality of device dampers 401 are provided in series between the chamber 300 and the turbo-molecular pump main body 100 and between the chamber 300 and the frame 402, respectively, thereby achieving an improvement in terms of vibration damping effect for the chamber 300. However, to cope with the recent years' miniaturization in semiconductor manufacturing process, increase in resolution for electron microscopes, etc., there is a demand for a further reduction in vibration in low-frequency bands.

Further, as a result of the recent increase in the volume of the chamber 300 of a semiconductor manufacturing apparatus or the like, there is a demand for an increase in evacuation speed for the turbo-molecular pump main body 100. To cope with this, the turbo-molecular pump main body 100 and the pump damper 301 have been increased in size.

If its vibration damping effect is to be maintained at a fixed level or more, such an increase in the size of the pump damper 301 could lead to an increase in cost.

Further, the dry-sealed vacuum pump (not shown) connected to the turbo-molecular pump main body 100 generates vibration, which, although small, is transmitted to the turbo-molecular pump main body 100, etc. through the dry-sealed vacuum pump passage, causing the chamber 300 to vibrate. Further, vibration generated by this dry-sealed vacuum pump and other semiconductor manufacturing apparatus, etc., vibration generated by people walking, etc. are also transmitted to the floor 400, and may cause the chamber 300 to vibrate.

Such vibration of the chamber 300 cannot be avoided by reducing the vibration of the turbo-molecular pump main body 100 itself, and there is a demand for a reduction in vibration in the apparatus system as a whole including not only the turbo-molecular pump main body 100 but also the chamber 300.

To solve this problem, JP 2002-147454 A discloses a rotary machine equipped with a magnetic bearing device capable of reducing vibration in a place spaced apart from the magnetic bearing to some degree. In the rotary machine equipped with this magnetic bearing device, a vibration detecting sensor is arranged on the flange 303 of the pump damper 301, a flange (not shown) on the chamber 300 side or the like, and, on the basis of a detection signal detected by this vibration detecting sensor, reverse-phase vibration is imparted to the rotor 103, thereby canceling the vibration of the apparatus system as a whole.

However, in the case of JP 2002-147454 A, it is necessary to newly prepare a vibration detecting sensor for the turbo-molecular pump main body 100, resulting in an increase in parts cost Further, since this vibration detecting sensor is arranged on the pump damper 301 side, the chamber 300 side, etc., it is necessary to secure previously an installation space around the pump damper 301, the chamber 300, etc., and, to establish communication between the vibration detecting sensor and the control device 200, it is necessary to newly provide a signal line between the pump damper 301, the chamber 300, etc.

SUMMARY OF THE INVENTION

The present invention has been made in view of the above-mentioned conventional problem, and therefore an object of the present invention is to provide a magnetic bearing device with a vibration restraining function, a magnetic bearing device with a vibration estimating function, and a pump device with the magnetic bearing devices mounted thereto, in which it is possible to realize a reduction in vibration in the apparatus system as a whole inclusive of the equipment associated with the vacuum pump without newly providing a vibration sensor.

Therefore, according to a first aspect of the present invention, the invention relates to a magnetic bearing device with a vibration restraining function, including: a rotor; electromagnets applying a levitating force to the rotor; a stator portion to which the electromagnets are secured; displacement detecting means for detecting radial and/or axial relative displacement of the rotor with respect to the stator portion; a magnetic bearing control compensator that calculates an adjusting amount of the levitating force on the basis of the relative displacement detected by the displacement detecting means; electromagnet control means for adjusting the levitating force in accordance with a calculation result of the adjusting amount of the levitating force as obtained by the magnetic bearing control compensator; vibration detecting means for detecting a predetermined physical amount of a stationary apparatus portion whose position relative to the stator portion is fixed; and adding means for adding an output of the vibration detecting means, with a polarity of the output reversed, to a transfer signal of magnetic bearing feedback control means formed at least by the displacement detecting means, the magnetic bearing control compensator, and the electromagnet control means, the magnetic bearing device being characterized in that: the predetermined physical amount is at least one of an acceleration of the stationary apparatus portion and/or the stator portion, a displacement, a speed, and an addition acceleration, each of the displacement, the speed, and the addition acceleration being obtained by differentiating or integrating the acceleration a requisite number of times; and the acceleration is a transformation result obtained through transformation of a first multiplication result into time domain, the first multiplication result being obtained by multiplying a detected by the displacement detecting means by a predetermined transfer function.

The vibration detecting means detects the predetermined physical amount of the stationary apparatus portion and/or the stator portion, and outputs it to the addition means. Further, the addition means reverses the polarity of the signal output from the vibration detecting means and adds it to the output of the magnetic bearing feedback control means.

As a result, the magnetic bearing device can be endowed with a vibration restraining function.

The Laplace transformation of the displacement of the rotor refers to Y(s) in Equation 5.

Further, the present invention relates to the magnetic bearing device with a vibration restraining function, including unbalance force detecting means for detecting or estimating an unbalance force acting on the rotor, characterized in that the acceleration is a transformation result obtained through transformation of an addition result into time domain, the addition result being obtained by adding to the first multiplication result a second multiplication result obtained by multiplying a Laplace transformation of a variation in the unbalance force acting on the rotor detected or estimated by the unbalance force detecting means by a reciprocal of a mass of the rotor.

As a result, the magnetic bearing device can be endowed with a vibration restraining function for restraining vibration generated in the stationary apparatus portion and/or the stator portion due to the unbalance force acting on the rotor.

The Laplace transformation of the variation in the unbalance force refers to $U_b(S)$ in Equation 4.

Further, the present invention relates to the magnetic bearing device with a vibration restraining function, characterized in that the predetermined transfer function is expressed by a transfer function peculiar to the magnetic bearing feedback control means, the transfer function being a relationship between the relative displacement of the rotor and a force acting between the electromagnets and the rotor due to the relative displacement, and by a mass of the rotor.

The predetermined transfer function is a function defined by the mass of the rotor and the transfer function peculiar to the magnetic bearing feedback control means. Here, the transfer function peculiar to the magnetic bearing feedback control means is a function determined at the designing stage for the magnetic bearing.

As a result, it is possible to calculate the predetermined transfer function solely with the parameters in the magnetic bearing device, without newly providing a vibration sensor.

The transfer function peculiar to the magnetic bearing feedback control means refers to F(s) in Equations 4 and 5.

Further, the present invention relates to a magnetic bearing device with a vibration restraining function, including: a rotor; electromagnets applying a levitating force to the rotor; a stator portion to which the electromagnets are secured; displacement detecting means for detecting radial and/or axial relative displacement of the rotor with respect to the stator portion; a magnetic bearing control compensator that calculates an adjusting amount of the levitating force on the basis of the relative displacement detected by the displacement detecting means; electromagnet control means for adjusting the levitating force in correspondence with a calculation result of the adjusting amount of the levitating force obtained by the magnetic bearing control compensator; vibration detecting means for detecting a predetermined physical amount of a stationary apparatus portion whose position relative to the stator portion is fixed; and adding means for adding an output of the vibration detecting means, with a polarity of the output reversed, to a transfer signal of magnetic bearing feedback control means formed at least by the displacement detecting means, the magnetic bearing control compensator, and the electromagnet control means, the magnetic bearing device being characterized in that: the predetermined physical amount is at least one of an acceleration of the stationary apparatus portion and/or the stator portion, a displacement, a speed, and an addition acceleration, each of the displacement, the speed, and the addition acceleration being obtained by differentiating or integrating the acceleration a requisite number of times; and the acceleration is a subtraction result obtained by subtracting a result obtained by performing second-order differentiation on the relative displacement of the rotor detected by the displacement detecting means, from a third multiplication result obtained by multiplying one of the calculation result of the adjusting amount of the levitating force obtained by the magnetic bearing control compensator and an addition result obtained by the adding means by a reciprocal of a mass of the rotor.

When the addition means adds the output of the vibration detecting means, with the polarity of the output reversed, to the calculation result of the adjustment amount of the levitating force obtained by the magnetic bearing control compensator, the acceleration is the subtraction result obtained by subtracting the result obtained by performing second-order differentiation on the relative displacement of the rotor detected by the displacement detecting means, from the third multiplication result obtained as the result of the multiplication of the addition result obtained by the addition means and the reciprocal of the mass of the rotor.

Unlike in the first aspect of the invention, no calculation of the transfer function is performed when detecting the acceleration, etc. of the stationary apparatus portion and/or the stator portion. Instead, the levitating force itself applied to the rotor from the electromagnets is used. As the levitating force, the calculation result of the adjusting amount of the levitating force obtained by the magnetic bearing control compensator or the addition result obtained through addition by the addition means is used.

In this way, in detecting the acceleration, etc. of the stationary apparatus portion and/or the stator portion, the calculation result of the adjusting amount of the levitating force obtained by the magnetic bearing control compensator or the addition result obtained through addition by the addition means, which is already known, is used, so that it is possible to accurately calculate the acceleration, etc. of the stationary apparatus portion and/or the stator portion by using an inexpensive computing device.

Further, the present invention relates to the magnetic bearing device with a vibration restraining function, including magnetic flux detecting means for detecting a variation in a magnetic flux generated between the electromagnets and the rotor, characterized in that a multiplication result which is obtained by using a value proportional to the variation in the magnetic flux detected by the magnetic flux detecting means instead of the calculation result of the adjusting amount of the levitating force obtained by the magnetic bearing control compensator, is used as the third multiplication result.

As the adjusting amount of the levitating force to be applied to the rotor from the electromagnets, there is used a value proportional to the variation in the magnetic flux detected by the magnetic flux detecting means.

Thus, calculation of the transfer function is not performed, and thus it is possible to accurately calculate the acceleration, etc. of the stationary apparatus portion and/or the stator portion by using an inexpensive computing device.

Further, the present invention relates to the magnetic bearing device with a vibration restraining function, including: an induction motor for rotating the rotor; and motor control means for controlling an energization state of the induction motor, characterized in that, when the predetermined physical amount is to be detected by the vibration detecting means, the motor control means brings the induction motor into a non-energized state.

Generally speaking, when a motor uses a permanent magnet as the field means, it is difficult to accurately ascertain the force applied to the rotor due to uncertain property changes such as demagnetization of the permanent magnet.

However, by using an induction motor having no permanent magnet, it is possible, when detecting a predetermined physical amount by the vibration detecting means, to eliminate the influence of the induction motor on the rotor by supplying no electricity to the induction motor.

As a result, it is possible to accurately detect the predetermined physical amount.

Further, the present invention relates to the magnetic bearing device with a vibration restraining function, including a rotation frequency follow-up type notch filter adapted to follow up a rotation frequency of the rotor to eliminate a frequency component of the rotation frequency, characterized in that at least one of the acceleration, the displacement, the speed, and the addition acceleration is a result obtained by passing the subtraction result through the rotation frequency follow-up type notch filter.

The unbalance force acting on the rotor is approximated to a sine wave whose frequency is the rotation frequency of the rotor. In view of this, by providing a rotation frequency following type notch filter following the rotation frequency of the rotor to eliminate the frequency component, it is possible to detect the acceleration, etc. of the stationary apparatus portion and/or the stator portion without taking into account the result obtained around the rotation frequency of the rotor.

This leads to generation of a dead band around the rotation frequency of the rotor. However, in the other frequency bands, it is possible to eliminate the influence of the unbalance force to accurately calculate the acceleration, etc. of the stationary apparatus portion and/or the stator portion.

The rotation frequency refers to the number of rotation per second.

Further, the present invention relates to the magnetic bearing device with a restraining function, including a low-pass filter through which at least one of the acceleration, the displacement, the speed, and the addition acceleration is passed.

Due to the provision of the low-pass filter through which acceleration, etc. pass, it is possible to perform calculation by a strictly proper formula in the Laplace domain.

As a result, no differentiator is required in the calculation process, so that it is possible to improve the stability of the feedback control system that performs vibration restraint control on the basis of the acceleration, etc. of the stationary apparatus portion and/or the stator portion, and to achieve a reduction in noise.

Further, the present invention relates to the magnetic bearing device with a vibration restraining function, including vibration restraint control compensating means for performing at least one of gain adjustment and/or phase compensation, PID control, and other control compensation on the output of the vibration detecting means.

The vibration restraint control compensating means may consist of a compensator effecting gain adjustment and/or phase compensation on the output signal of the vibration detecting means, or a PID control compensator, or other type of control compensators, such as an optimum control compensator, an the control compensator, or a sliding mode control compensator. Further, it is also possible to adopt a combination of at least two of these compensators.

The above arrangement makes it possible to effectively restrain vibration without dispersing vibration of the stationary apparatus portion and/or the stator portion.

Further, the present invention relates to a magnetic bearing device with a vibration estimating function, including: a rotor; electromagnets applying a levitating force to the rotor; a stator portion to which the electromagnets are secured; displacement detecting means for detecting radial and/or axial relative displacement of the rotor with respect to the stator portion; a magnetic bearing control compensator that calculates an adjusting amount of the levitating force based on the displacement detected by the displacement detecting means; electromagnet control means for adjusting the levitating force in correspondence with a calculation result of the adjusting amount of the levitating force obtained by the magnetic bearing control compensator; vibration detecting means for detecting a predetermined physical amount of a stationary apparatus portion whose relative position with respect to the stator portion is fixed; and adding means for adding an output of the vibration detecting means, with a polarity of the output reversed, to a transfer signal of magnetic bearing feedback control means formed at least by the displacement detecting means, the magnetic bearing control compensator, and the electromagnet control means, the magnetic bearing device being characterized in that: the predetermined physical amount is at least one of an acceleration of the stationary apparatus portion and/or the stator portion, a displacement, a speed, and an addition acceleration, each of the displacement, the speed, and the addition acceleration being obtained by differentiating or integrating the acceleration a requisite number of times; and the acceleration is a transformation result obtained through transformation of a first multiplication result into time domain, the first multiplication result being obtained by multiplying a Laplace transformation of the relative displacement of the rotor detected by the displacement detecting means by a predetermined transfer function.

Further, the present invention relates to a magnetic bearing device with a vibration estimating function, including: a rotor; electromagnets applying a levitating force to the rotor; a stator portion to which the electromagnets are secured; displacement detecting means for detecting radial and/or axial relative displacement of the rotor with respect to the stator portion; magnetic bearing control compensator that calculates an adjusting amount of the levitating force based on the displacement detected by the displacement detecting means; electromagnet control means for adjusting the levitating force in correspondence with a calculation result of the adjusting amount of the levitating force obtained by the magnetic bearing control compensator; vibration detecting means for detecting a predetermined physical amount of a stationary apparatus portion whose relative position with respect to the stator portion is fixed; and adding means for adding an output of the vibration detecting means, with a polarity of the output reversed, to a transfer signal of magnetic bearing feedback control means formed at least by the displacement detecting means, the magnetic bearing control compensator, and the electromagnet control means, the magnetic bearing device being characterized in that: the predetermined physical amount is at least one of an acceleration of the stationary apparatus portion and/or the stator portion, a displacement, a speed, and an addition acceleration, each of the displacement, the speed, and the addition acceleration being obtained by differentiating or integrating the acceleration a requisite number of times; and the acceleration is a subtraction result obtained through subtraction of a result obtained by performing second-order differentiation on the relative displacement of the rotor detected by the displacement detecting means, from a third multiplication result obtained by multiplying one of the calculation result of the adjusting amount of the levitating force obtained by the magnetic bearing control compensator and an addition result obtained by the adding means by a reciprocal of a mass of the rotor.

Further, the present invention relates to the magnetic bearing device with a vibration estimating function, including magnetic flux detecting means for detecting a variation in a magnetic flux generated between the electromagnets and the rotor, characterized proportional to the variation in the magnetic flux detected by the magnetic flux detecting means instead of the calculation result of the adjusting amount of the levitating force obtained by the magnetic bearing control compensator, is used as the third multiplication result.

Further, the present invention relates to a pump device with one of a vibration restraining function and a vibration estimating function which includes a vacuum pump with a magnetic bearing device mounted thereto, characterized in that the vacuum pump is installed in associated equipment and adapted to suck a predetermined gas from the associated equipment.

The vacuum pump is installed in the associated equipment, and has mounted thereto the magnetic bearing device with one of a vibration restraining function and a vibration estimating function.

The above arrangement makes it possible to realize a reduction in or estimation of vibration in the apparatus system as a whole inclusive of the equipment associated with the vacuum pump without newly providing a vibration sensor.

DETAILED DESCRIPTION OF THE PREFERRED EMBODIMENTS

Figure 1:
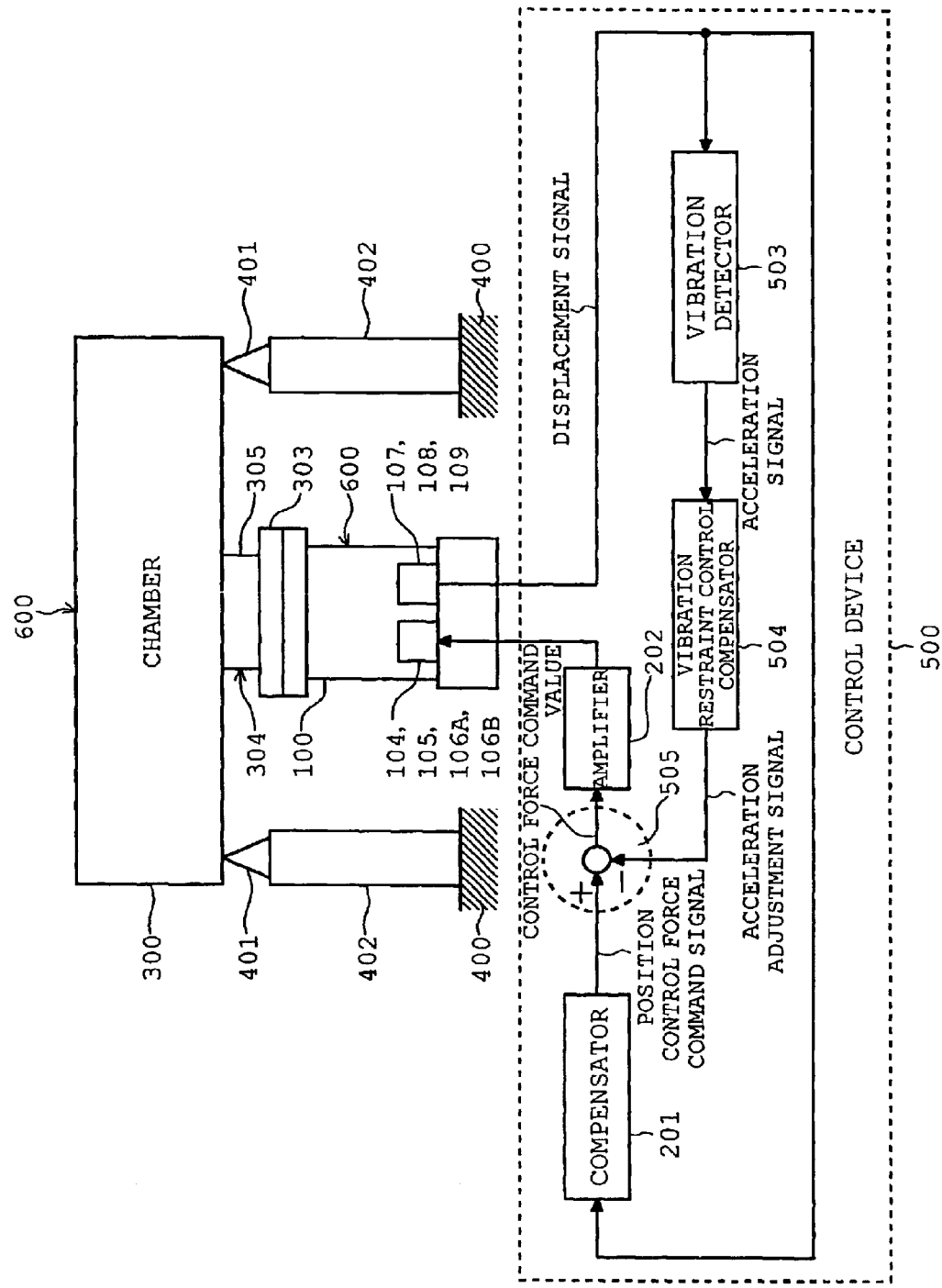
FIG. 1 is a schematic diagram showing an apparatus system as a whole according to a first embodiment of the present invention.
Figure 11:
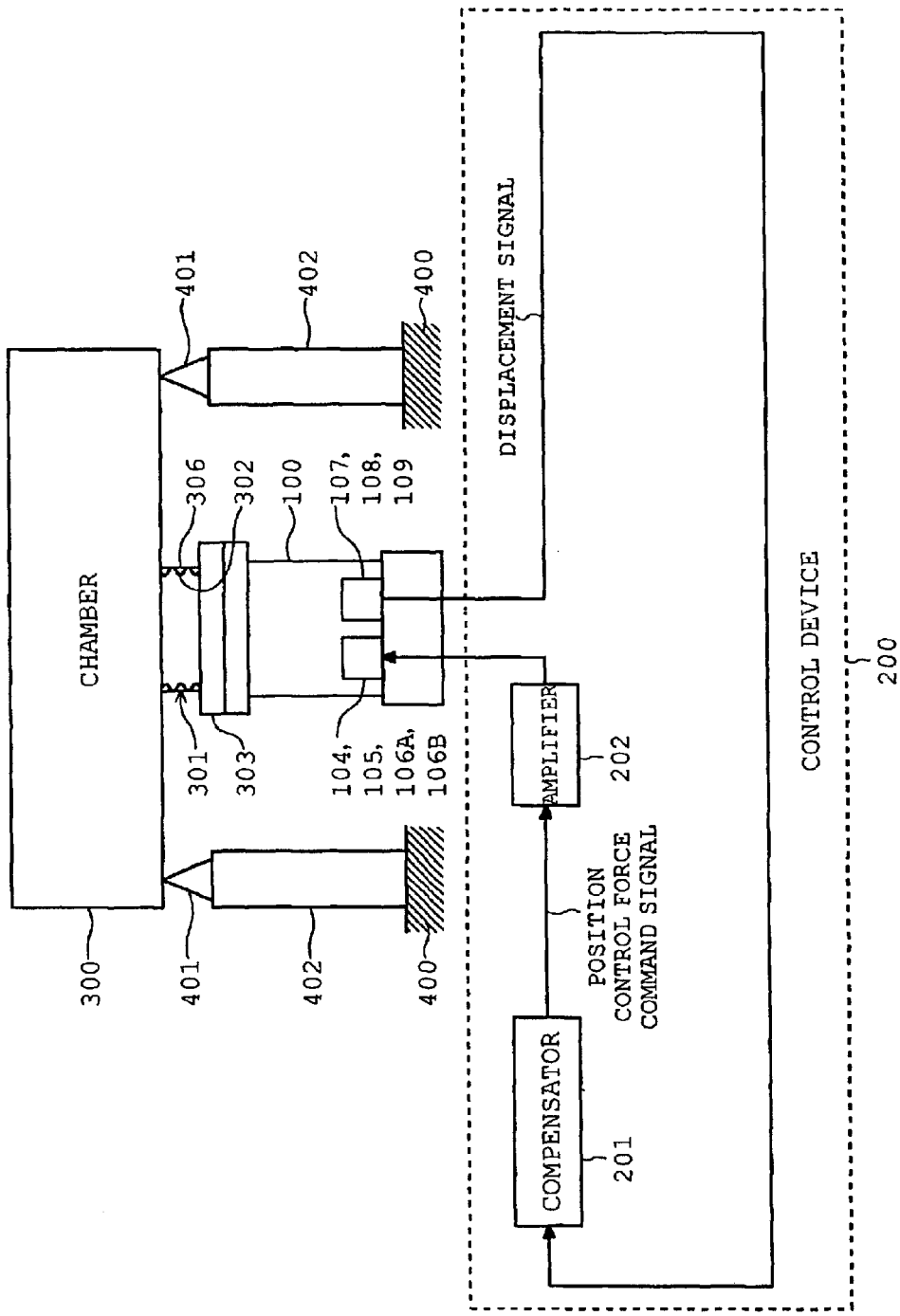
FIG. 11 is a schematic diagram showing a conventional apparatus system as a whole.

In the following, a first embodiment of the present invention will be described. FIG. 1 is a schematic diagram showing an apparatus system as a whole according to the first embodiment of the present invention. The components that are the same as those of FIG. 11 are indicated by the same symbols, and a description of such components will be omitted.

A control device 500, shown in FIG. 1, includes, in addition to the conventional control device 200 equipped with magnetic bearing feedback control means, a vibration detector 503 serving as the vibration detecting means, a vibration restraint control compensator 504 serving as the vibration restraint control compensating means, and an adder 505 serving as the adding means.

Input to the vibration detector 503 are displacement signals output from rotor position sensors 107, 108, and 109 of the turbo-molecular pump main body 100.

Further, in the vibration detector 503, a first multiplication result obtained through multiplication of Laplace transformation of displacement of the rotor 103 and a predetermined transfer function and a second multiplication result obtained through multiplication of Laplace transformation of a variation in an unbalance force acting on the rotor 103 and the reciprocal of the mass of the rotor 103, are added together, and the addition result is transformed into time domain, the transformation result being output as an acceleration signal of a stationary apparatus portion 600.

Further, inside the vibration detector 503, the requisite parameters for the calculation of a transfer function are previously determined (or previously measured), and are stored in a storage device (not shown) or the like. The output signal of the vibration detector 503 is output to the vibration restraint control compensator 504 as the acceleration of the stationary apparatus portion 600.

The stationary apparatus portion 600 refers to the chamber 300 and the portion of the turbo-molecular pump main body 100 other than the rotor 103.

The vibration restraint control compensator 504 multiplies the acceleration signal output from the vibration detector 503 by an amplification factor with a predetermined frequency characteristic to adjust gain, and effects phase compensation to prevent divergence or oscillation of the stationary apparatus portion 600.

Input to the adder 505 are a position control force command signal that is an output signal of the compensator 201 and an acceleration adjustment signal that is an output signal of the vibration restraint control compensator 504. In order that the vibration of the stationary apparatus portion 600 may be restrained, the adder 505 is adapted to reverse the polarity (positive/negative) of the acceleration adjustment signal and to add it to the position control force command signal.

A control force command value, which is an addition result obtained by the adder 505, is output to the amplifier 202 serving as the electromagnet control means. As a result, a levitating support force is applied to the rotor 103 from the amplifier 202 through the electromagnets 104, 105, 106A, and 106B. At this time, the electromagnets 104, 105, 106A, and 106B (that is, the stationary apparatus portion 600) receive the reaction force of the levitating support force. Since the reaction force includes a force restraining vibration of the stationary apparatus portion 600, vibration of the stationary apparatus portion 600 is restrained by this force.

Further, unlike the apparatus system shown in FIG. 11, the apparatus system shown in FIG. 1 has a pump fixing portion 304 provided between the turbo-molecular pump main body 100 and the chamber 300.

This pump fixing portion 304 is equipped with a cylindrical fixing column 305, and is adapted to fix the turbo-molecular pump main body 100 to the chamber 300.

At this time, one end of the fixing column 305 is fastened to the chamber 300 through the intermediation of a flange (not shown), and the other end thereof is fastened to the intake hole 101 of the turbo-molecular pump main body 100 through the intermediation of a flange 303.

Next, the operation of the apparatus system according to the first embodiment of the invention will be described.

First, a method of deriving the acceleration of the stationary apparatus portion 600 will be described with reference to FIG. 2, which is a block diagram showing the apparatus system as a whole. The components that are the same as those of FIG. 1 are indicated by the same symbols and a description of such components will be omitted.

Figure 2:
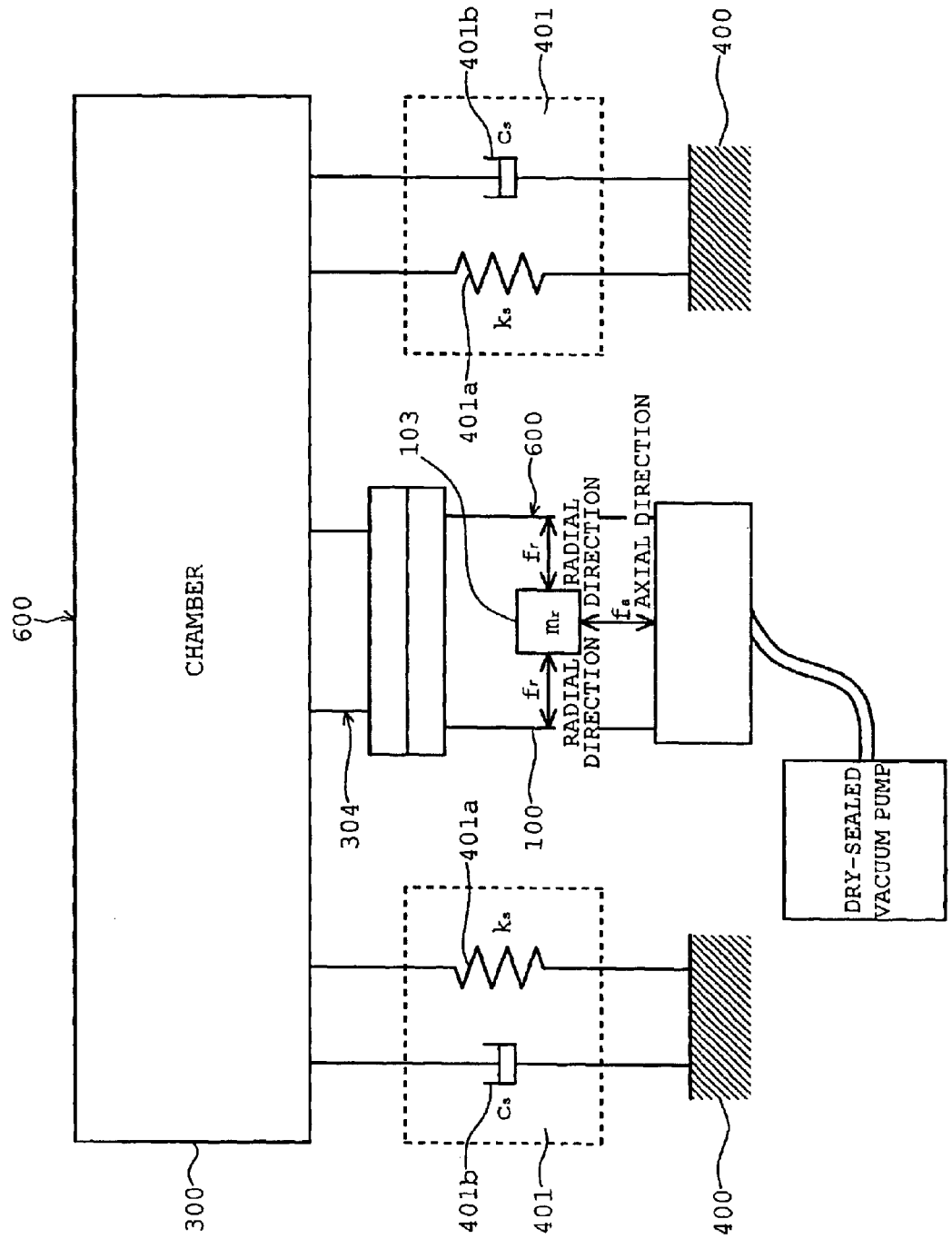
FIG. 2 is a block diagram showing the apparatus system as a whole.

FIG. 2 shows an apparatus damper 401, whose function can be modeled by an elastic member 401a having a spring constant of $k_s$ and a viscous drag 401b having a viscosity coefficient of $c_s$.

Further, the rotor 103 of the turbo-molecular pump main body 100 is supported in a levitating state by the electromagnets 104, 105, 106A, and 106B.

In the Laplace domain, the rigidity in this levitation support can be radially expressed by a transfer function $F_r(s)$ whose input is the Laplace transformation of radial displacement of the rotor 103 with respect to the stationary apparatus portion 600 and whose output is the Laplace transformation of variation in the force applied from the electromagnets 104 and 105 to the rotor 103.

Further, with respect to the axial direction, the rigidity in this levitation support can be expressed by a transfer function $F_a(s)$ whose input is the Laplace transformation of axial displacement of the rotor 103 with respect to the stationary apparatus portion 600 and whose output is the Laplace transformation of variation in the sum of the forces applied from the electromagnets 106A and 106B to the rotor 103.

Thus, these transfer functions $F_r(s)$ and $F_a(s)$ may be regarded as transfer functions peculiar to the magnetic bearing feedback control means composed of the compensator 201, amplifier 202, etc. of the control device 500.

Further, unlike the conventional one, the turbo-molecular pump main body 100 is secured to the chamber 300, so that the stationary apparatus portion 600, that is, the chamber 300 and the portion of the turbo-molecular pump main body 100 other than the rotor 103, may be regarded as an integral unit.

Figure 3:
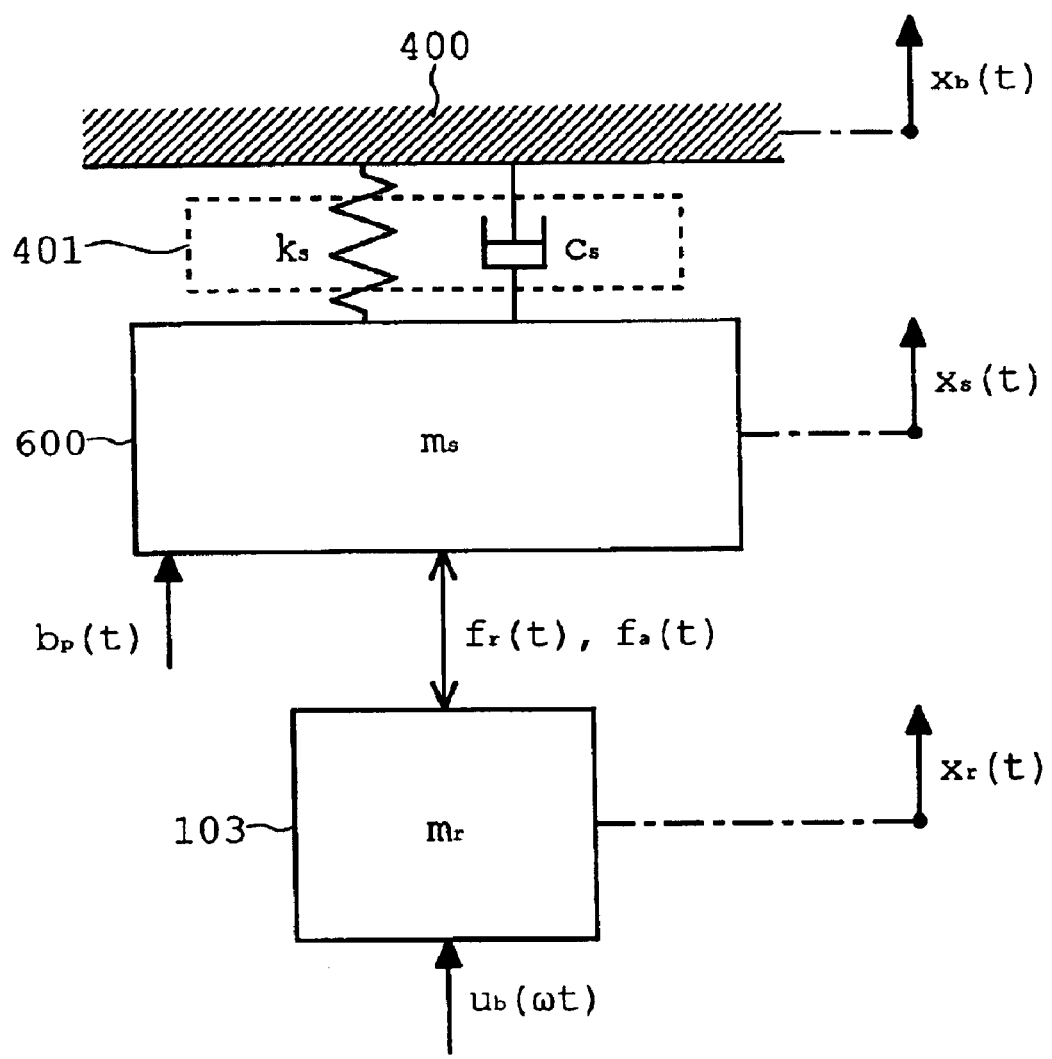
FIG. 3 is a diagram showing a motion model of the apparatus system as a whole.

From what has been described above, the motion model between the floor 400, the stationary apparatus portion 600, and the rotor 103 can be expressed as the model as shown in FIG. 3 in both the radial and axial directions.

In FIG. 3, displacement $x_b$ (t) represents absolute displacement of the floor 400. And, displacement $x_s$ (t) indicates absolute displacement of the stationary apparatus portion 600, and displacement $x_r$ (t) indicates absolute displacement of the rotor 103.

Further, the mass $m_s$ indicates the mass of the stationary apparatus portion 600, and the mass $m_r$ indicates the mass of the rotor 103.

Further, disturbance force $b_p$ (t) indicates the disturbance force acting on the stationary apparatus portion 600. The disturbance force $b_p$ (t) may, for example, be vibration, etc. transmitted from the dry-sealed vacuum pump connected to the turbo-molecular pump main body 100.

Further, unbalance force $u_b$ (t) is the unbalanced force generated due to positional deviation between the configuration central axis and inertia central axis of the rotor 103.

Assuming that the relative displacement of the rotor 103 with respect to the stationary apparatus portion 600 is y (t), this relative displacement y(t) can be defined as in Equation 1.

$$y(t)=x_r(t)-x_s(t) \quad \text{[Equation 1]}$$

Further, in FIG. 2, by defining a function f while expressing the fact that the rotor 103 is supported in a levitating state by the stationary apparatus portion 600 as a relationship between the relative displacement y(t) and the force applied to the rotor 103 from the electromagnets 104 and 105 or the electromagnets 106A and 106B, an equation of motion for the rotor 103 can be expressed as shown in Equation 2.

$$-m_r \cdot \ddot{x}_r(t) - f(y(t)) + u_b(t) = 0 \quad \text{[Equation 2]}$$

Further, through introduction of Equation 1, Equation 2 can be expressed as shown in Equation 3.

$$-m_r\{\ddot{y}(t)+\ddot{x}_s(t)\}-f(y(t))+u_b(t)=0 \quad \text{[Equation 3]}$$

Here, the f(y(t)) can be expressed as a linear equation of y(t), so that through Laplace transformation of Equation 3, with the initial value being 0, Equation 4 is obtained. Symbols indicates Laplace operator.

$$s^2 X_s(s) = -\frac{m_r \cdot s^2 + F(s)}{m_r} Y(s) + \frac{1}{m_r} U_b(s) \quad \text{[Equation 4]}$$

The left side of Equation 4 expresses the acceleration of the stationary apparatus portion 600 in the Laplace domain. Through transformation of both sides of the Equation 4 into time domain, it is possible to obtain the acceleration of the stationary apparatus portion 600.

Here, the relative displacement y(t) can be detected by the rotor position sensors 107, 108, and 109. Regarding the unbalance force $u_b$(t), it can be estimated, by forming an observer, from the control force with which the magnetic bearing supports the rotor 103 in a levitating state and displacement of the rotor 103 as detected by the rotor position sensors 107, 108, and 109, as disclosed, for example, in "Construction of Magnetic Bearing Control System Endowed with Unbalance Compensating Function" (by Mizuno and Higuchi, Transactions of Society of Instrument and Control Engineers, 20, 12, p1095), and "Resilient Rotor Feed Forward Type Unbalance Force Compensating Control" (International Journal of Japan Society of Mechanical Engineers, Volume C, 56, 528 (1990), pp. 2056–2064.

In these examples the unbalance force acting on the rotor 103 is estimated by an observer, and the unbalance force acting on the rotor 103 is compensated for through feed forward control, thereby restraining vibration of the rotor 103. In the present invention, however, the acceleration of the stationary apparatus portion 600 is obtained through calculation based on transformation result of Equation 4 or 5 (described below) into time domain, and this acceleration is restrained, which means that the present invention differs from the above examples in control object and control method. Further, while in these examples vibration of the rotor 103 is restrained, in the present invention, the rotor 103 is intentionally caused to vibrate, and, by utilizing the force acting on the stationary apparatus portion 600 due to the vibration, the vibration of the stationary apparatus portion 600 is restrained.

Further, as is apparent from Equation 4 or 5, the acceleration of the stationary apparatus portion 600 does not depend on the condition on the stationary apparatus 600 side, and can be obtained from a parameter existing on the turbo-molecular pump main body 100 side and displacement signals detected by the rotor position sensors 107, 108, and 109.

Next, the operation of restraining the vibration of the stationary apparatus portion 600 based on the calculated acceleration of the stationary apparatus portion 600, will be described.

The vibration detector 503 of the control device 500 obtains the acceleration of the stationary apparatus portion 600 through calculation of the result of transformation of both sides of Equation 4 into time domain, and outputs a signal representing this acceleration.

This signal is input to the vibration restraint control compensator 504, where the gain when addition to the output of the compensator 201 is effected is adjusted. Further, in the vibration restraint control compensator 504, the control device 500, the vibration restraint control compensator 504, and the turbo-molecular pump main body 100 constitutes the feedback control system, so that phase compensation or the like is effected on the acceleration signal so that the stationary apparatus portion 600 may not diverge or oscillate.

The acceleration adjustment signal output from the vibration restraint control compensator 504 is sent to the adder 505, where its polarity (positive/negative) is reversed so as to restrain the vibration of the stationary apparatus portion 600, and is added to the position control force command signal, which is the output of the compensator 201.

The addition result, i.e., the control force command value, is output to the amplifier 202, which excites the electromagnets 104, 105, 106A, and 106B on the basis of the control force command value from the adder 505 to support the rotor 103 in a levitating state. At this time, the electromagnets 104, 105, 106A, and 106B (that is, the stationary apparatus portion 600) receive reaction force of the levitating support force applied to the rotor 103. Since this reaction force contains a force restraining vibration of the stationary apparatus portion 600, vibration of the stationary apparatus portion 600 is restrained by this force.

In this way, with respect to the acceleration of the stationary apparatus portion 600, a force restraining this acceleration is generated in the reaction force of the levitating support force acting on the electromagnets 104, 105, 106A, and 106B, whereby it is possible to restrain vibration of the stationary apparatus portion 600.

Thus, the turbo-molecular pump main body 100 and the control device 500 are capable of restraining vibration of the apparatus system as a whole.

This restraint of vibration can be achieved by utilizing solely the displacement signals of the rotor position sensors 107, 108, and 109 and the parameter on the turbo-molecular pump main body 100 side, without newly installing a vibration detection sensor or the like.

Thus, it is possible to realize a reduction in vibration in the apparatus system as a whole inclusive of the equipment associated with the vacuum pump without newly providing a sensor.

While in this embodiment described above the vibration detector 503 obtains the acceleration of the stationary apparatus portion 600 through calculation of the transformation result of Equation 4 into time domain, this should not be construed restrictively.

That is, when the influence the unbalance force $u_b(t)$ acting on the rotor 103 exerts on the stationary apparatus portion 600 is to be neglected, it is also possible to obtain the acceleration of the stationary apparatus portion 600 through calculation of the result of transformation into time domain of the multiplication result obtained by multiplying displacement of the rotor 103 by a predetermined transfer function, e.g., through calculation of the result of transformation into time domain of both sides of Equation 5 shown below.

$$s^2 X_s(s) = -\frac{m_r \cdot s^2 + F(s)}{m_r} Y(s) \qquad \text{[Equation 5]}$$

Further, while in this embodiment the vibration restraint control compensator 504 effects gain adjustment and phase compensation on the output signal of the vibration detector 503, this should not be construed restrictively. It is also possible to adopt a PID control compensator, an optimum control compensator, an H∞ control compensator, a sliding mode control compensator or a compensator of some other type, or a combination of at least two of these compensators. Further, when the displacement of the rotor 103, which is the control object of the compensator 201, and the acceleration of the stationary apparatus portion 600, which is the control object of the vibration restraint control compensator 504, do not diverge or oscillate, there is no need to provide the vibration restraint control compensator 504.

Further, while in this embodiment described above the adder 505 adds the acceleration adjustment signal output from the vibration restraint control compensator 504 to the output signal of the compensator 201 after reversing the polarity (positive/negative) of the acceleration adjustment signal, and outputs the control force command value, which is the addition result thereof, to the amplifier 202, this should not be construed restrictively. The adder 505 may add the acceleration adjustment signal to any signal as long as it is a transfer signal in the feedback control loop of the control device 500.

For example, the adder 505 may be connected between the rotor position sensors 107, 108, and 109 and the compensator 201, and adds the acceleration adjustment signal output from the vibration restraint control compensator 504 to the displacement signals from the rotor position sensors 107, 108, and 109 after reversing the polarity (positive/negative) of the acceleration adjustment signal, and may output the addition result to the compensator 201. At this time, the vibration restraint control compensator 504 performs control compensation according to the transfer signal in the feedback control loop in which the acceleration adjustment signal is added by the adder 505 after being reversed in polarity (positive/negative).

Further, when, as described above, the adder 505 is connected between the rotor position sensors 107, 108, and 109 and the compensator 201, the compensator 201 is generally endowed with a function by which it performs other control compensations such as signal gain adjustment, signal phase compensation, PID control compensation, optimum control compensation, H∞ control compensation, sliding mode control compensation, etc. Thus, the function which has been conducted by the vibration restraint control compensator 504 can be easily incorporated into the compensator 201.

Further, this embodiment is applicable not only to a 5-axis control magnetic bearing, but also to 3-axis and 1-axis control magnetic bearings. For example, in the case of 1-axis control, only an electromagnet having the control function exists for one axis, so that, when the stationary apparatus portion 600 vibrates, the direction in which a force restraining the vibration can be applied is one direction allowing control by the electromagnet.

Further, while in this embodiment vibration of the stationary apparatus portion 600 is restrained by calculating the acceleration of the stationary apparatus portion 600, this may also be achieved by calculating a physical amount corresponding to the result obtained by differentiating or integrating the acceleration the requisite number of times, such as the addition acceleration, speed, position of the stationary apparatus portion 600.

Next, a second embodiment of the present invention will be described.

Figure 4:
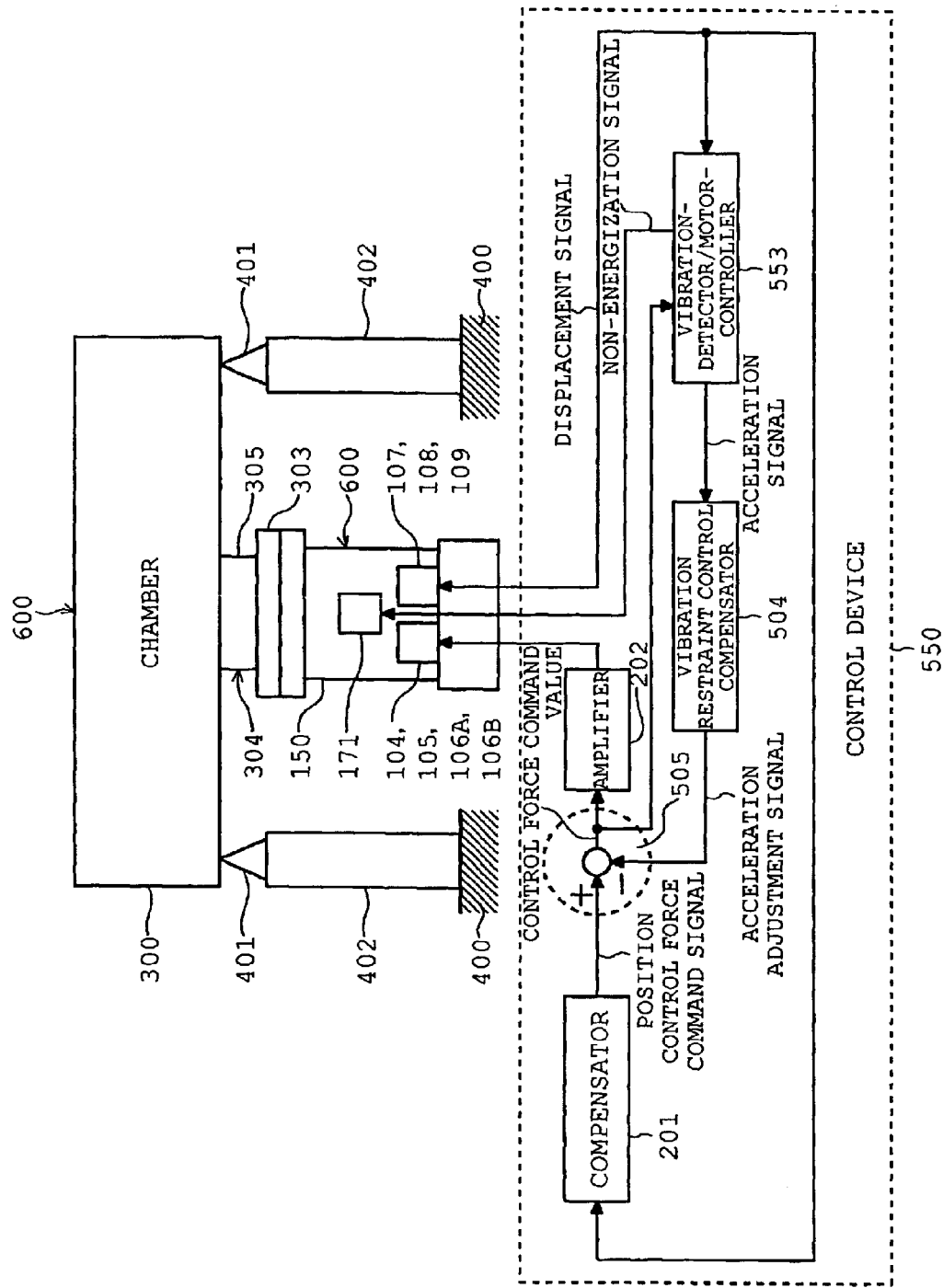
FIG. 4 is a schematic diagram showing an apparatus system as a whole according to a second embodiment of the present invention.

While in the apparatus system of the first embodiment transfer functions $F_r(s)$ and $F_a(S)$ are calculated when obtaining the force applied to the rotor 103 from the electromagnets 104 and 105 or the electromagnets 106A and 106B, in the apparatus system of this embodiment, a control force command value, etc. output from the adder 505 are used instead of calculating the transfer functions $F_r(s)$ and $F_a(s)$ FIG. 4 is a schematic diagram showing an apparatus system as a whole according to the second embodiment of the present invention. The components that are the same as those of FIG. 1 are indicated by the same symbols, and a description of such components will be omitted.

The control device 550 shown in FIG. 4 is equipped, instead of the vibration detector 503 of the first embodiment, with a vibration-detector/motor-controller 553 serving as the vibration detecting means and the motor control means.

A control force command value, which is the output of the adder 505, is input to this vibration-detector/motor-controller 553. In the vibration-detector/motor-controller 553, this control force command value is used when obtaining the acceleration of the stationary apparatus portion 600.

Further, in the turbo-molecular pump main body 150 of this embodiment, an induction motor 171 is used instead of the motor 121 of the first embodiment having a permanent magnet. Output to this induction motor 171 from the vibration-detector/motor-controller 553 is a non-energization signal. While the acceleration of the stationary apparatus portion 600 is being calculated in the vibration-detector/motor-controller 553, the induction motor 171 is in a non-energized (free-run) state.

Further, the vibration-detector/motor-controller 553 is equipped with a rotation frequency follow-up type notch filter 806 (described in detail below) for reducing the error due to the unbalance force $u_b(t)$ acting on the rotor 103.

Instead of the control force command value output from the adder 505, a magnetic flux detection signal indicating variation in the magnetic flux generated between the rotor 103 and the electromagnets 104 and 105 or the electromagnets 106A and 106B may be input to the vibration-detector/motor-controller 553 of this embodiment. Then, it is also possible to obtain the acceleration of the stationary apparatus portion 600 on the basis of the variation in this magnetic flux.

Figure 5:
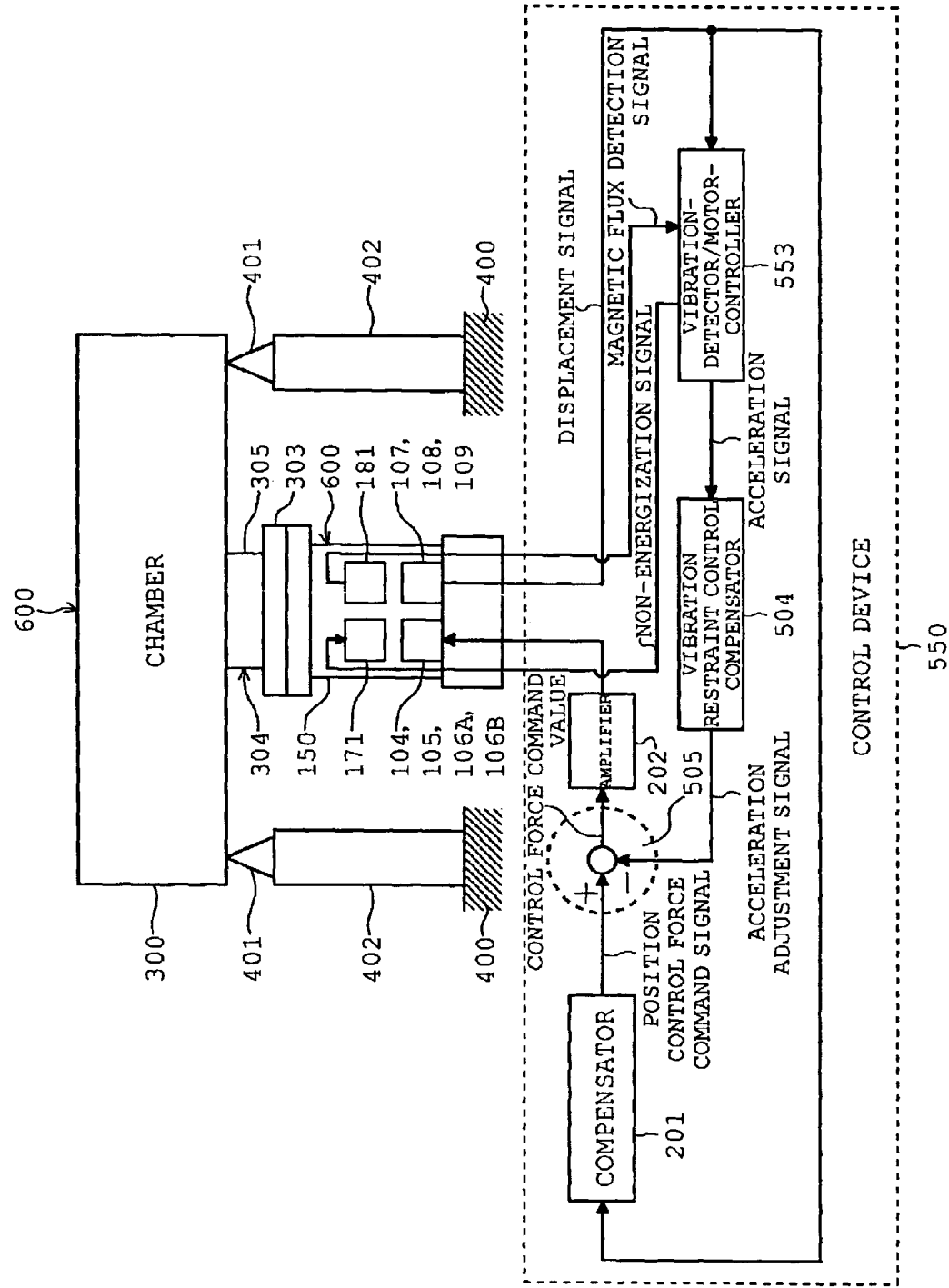
FIG. 5 is a schematic diagram showing an another example of an apparatus system as a whole according to the second embodiment of the present invention.

In this case, as shown in FIG. 5, the turbo-molecular pump main body 150 is equipped with a magnetic flux detector 181 for detecting variation in the magnetic flux generated between the rotor 103 and the electromagnets 104 and 105 or the electromagnets 106A and 106B, and the detection result is output to the vibration-detector/motor-controller 553.

Next, the operation of the apparatus system of the second embodiment will be described.

First, a method of deriving the acceleration of the stationary apparatus portion 600 will be described.

Figure 6:
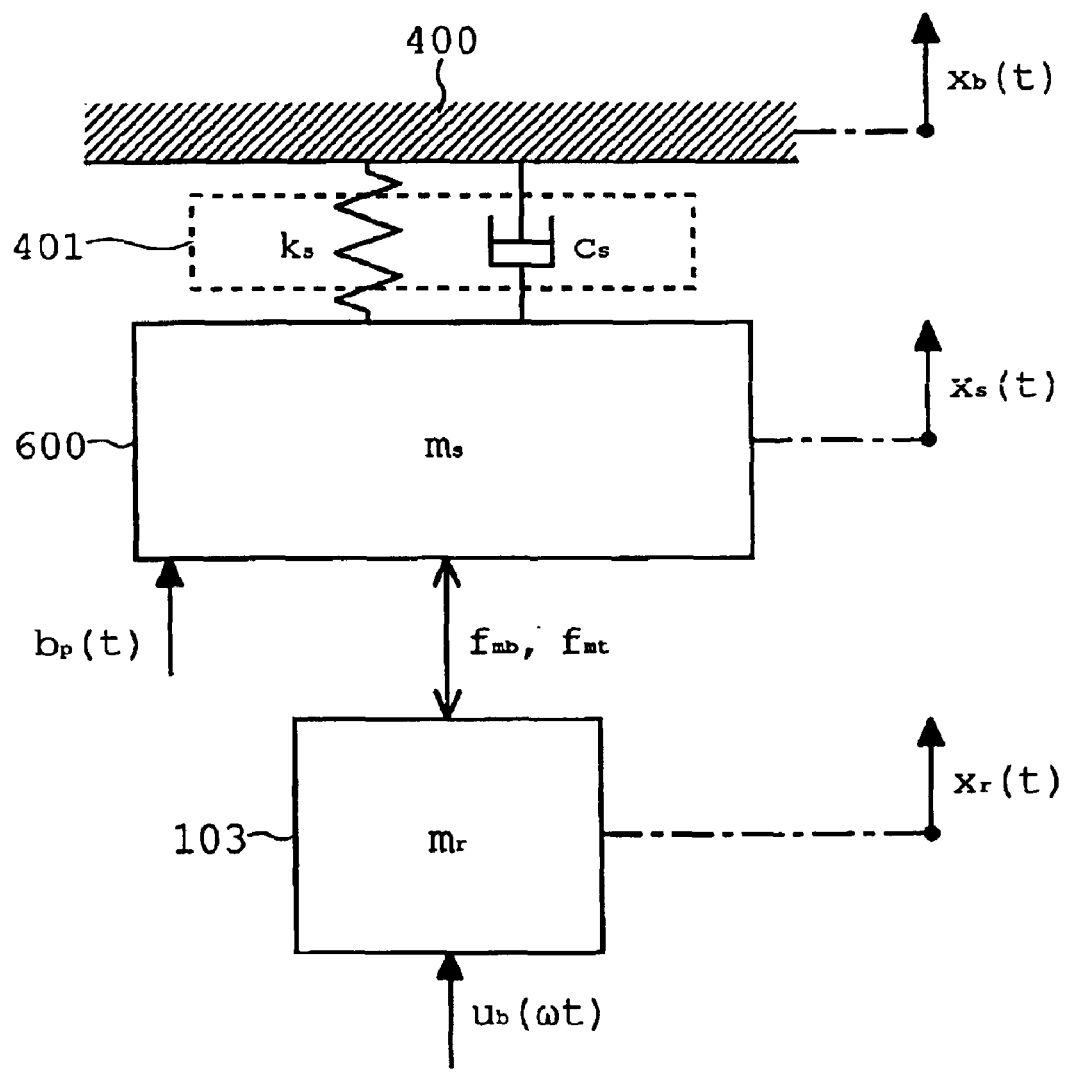
FIG. 6 is a diagram showing a motion model of the apparatus system as a whole.

In describing this method of driving the acceleration, FIG. 2, which is the same block diagram showing the apparatus system as a whole as used for the description of the first embodiment, will be referred to. FIG. 6 shows a motion model formed based on this block diagram.

The differences between the motion model shown in FIG. 6 and that of the first embodiment (shown in FIG. 3) are as follows.

First, while in the motion model of the first embodiment the functions $f_r$ and $f_a$ are defined as the relationship between the relative displacement y(t) and the force applied to the rotor 103 by the electromagnets 104 and 105 or the electromagnets 106A and 106B, no definition is made of these functions $f_r$ and $f_a$ in this embodiment. Instead, in this embodiment, the magnetic bearing levitating force adjusting amount $f_{mb}(t)$ itself is defined as the force applied to the rotor 103 by the electromagnets 104 and 105 or the electromagnets 106A and 106B.

Further, unlike the motion model of the first embodiment, the motion model of this embodiment takes into consideration a motor force $f_{mt}(t)$ as the force applied to the rotor 103 by the induction motor 171.

Normally, even in the case of the turbo-molecular pump main body 100 of the first embodiment, when the S- and N-poles of the permanent magnet on the rotor side of the motor 121 are opposed to each other with the axis of the rotor shaft 113 therebetween, and the electromagnets on the stator side are opposed to each other with the axis of the rotor shaft 113 therebetween, only the rotational torque component is generated in the rotor 103, and the force acting between the magnetic poles of the permanent magnet and the electromagnets of the motor 121 is all compensated for to be nullified. Thus, in this case, there is no need to take the motor force $f_{mt}(t)$ into consideration.

Actually, however, an error in the magnetic flux of the permanent magnet, offset of the rotor shaft 113 with respect to the electromagnets on the stator side, etc. may be involved. Due to these causes, the motor force $f_{mt}(t)$ is not nullified. Thus, to minimize the error in the calculation of the acceleration of the stationary apparatus portion 600, it is desirable to take this motor force $f_{mt}(t)$ into consideration.

Further, in the motion model of this embodiment, the unbalance force $u_b(t)$ is approximated to a sine wave the angular velocity of which is equal to the rotation angular velocity ω of the rotor 103 (hereinafter referred to as unbalance force $u_b(\omega t)$). As stated above, this unbalance force $u_b(\omega t)$ is an unbalance force generated due to positional deviation between the configuration central axis and inertia central axis of the rotor 103, so that the unbalance force $u_b(\omega t)$ can be thus approximated to a sine wave the angular velocity of which is ω.

Equation 6 is an equation of motion for the rotor 103, showing how the rotor 103 is supported by the stationary apparatus portion 600 in a levitating state.

$$-m_r \ddot{x}_r(t) + f_{mb}(t) + f_{mt}(t) + u_b(\omega t) = 0 \qquad \text{[Equation 6]}$$

Further, through introduction of the relative displacement y(t) as defined in Equation 1, Equation 6 can be expressed as in Equation 7.

$$-m_r \{\ddot{y}(t) + \ddot{x}_s(t)\} + f_{mb}(t) + f_{mt}(t) + u_b(\omega t) = 0 \qquad \text{[Equation 7]}$$

Further, by transforming Equation 7 somewhat, the following Equation 8 is obtained.

$$\ddot{x}_s(t) = (1/m_r)\{f_{mb}(t) + f_{mt}(t) + u_b(\omega t)\} - \ddot{y}(t) \qquad \text{[Equation 8]}$$

Here, the magnetic bearing levitating force adjusting amount $f_{mb}(t)$, the motor force $f_{mt}(t)$, and the unbalance force $u_b(\omega t)$ will be examined.

First, the magnetic bearing levitating force adjusting amount $f_{mb}(t)$ will be examined.

As stated above, in the first embodiment, the functions $f_r$ and $f_a$ are defined as the relationship between the relative displacement y(t) and the force applied to the rotor 103 by the electromagnets 104 and 105 or the electromagnets 106A and 106B. The functions $f_r$ and $f_a$ are transformed into a Laplace domain, and the acceleration of the stationary apparatus portion 600 in the Laplace domain is obtained from the transfer functions $F_r(s)$, $F_a(s)$, etc. Further, this is transformed into time domain, thereby obtaining the acceleration of the stationary apparatus portion 600.

However, the requisite parameters for the calculation of the transfer functions $F_r(s)$ and $F_a(s)$ must be determined or measured beforehand, and these must be stored in the vibration detector 503. Further, the calculation of the transfer functions $F_r(s)$ and $F_a(s)$ is complicated in itself, so that a high-speed computing unit is required.

In this embodiment, in contrast, instead of calculating the transfer functions $F_r(s)$ and $F_a(s)$, the magnetic bearing levitating force adjusting amount $f_{mb}(t)$ itself is defined, and a control force command value output from the adder 505 is used as the magnetic bearing levitating force adjusting amount $f_{mb}(t)$. In this way, in calculating the acceleration of the stationary apparatus portion 600, the control force command value, which is a known value, is used, so that even an inexpensive computing unit suffices.

Incidentally, in the case in which calculation is thus performed by regarding the control force command value as the magnetic bearing levitating force adjusting amount $f_{mb}(t)$, the error between the actual magnetic bearing levitating force adjusting amount $f_{mb}(t)$ and this control force command value can constitute a problem. However, this problem can be eliminated by arranging the electromagnets so as to be opposed to each other with the rotor 103 therebetween, in a plane perpendicular to the rotor shaft 113, and by using, as the control device 550, a high gain magnetic flux feedback controller in which the variation in the magnetic flux generated from the electromagnets 104 and 105 or the electromagnets 106A and 106B quickly follows up the control force command value output from the adder 505.

Figure 7:
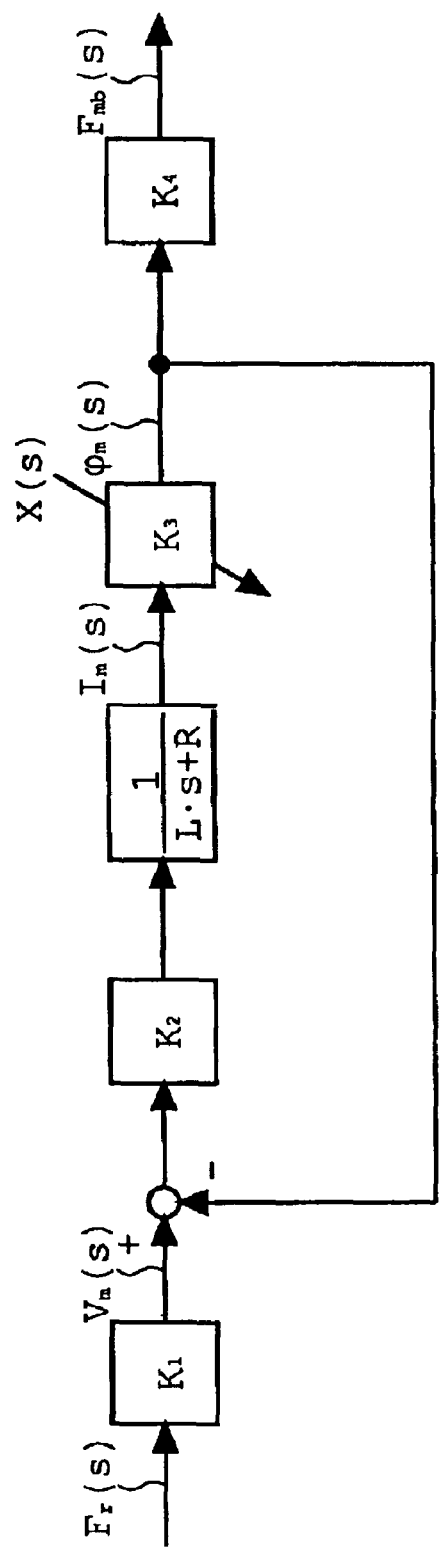
FIG. 7 is a block diagram showing a high-gain magnetic flux feedback controller.

FIG. 7 is a block diagram showing this high gain magnetic flux feedback controller. In FIG. 7, $F_r(s)$ indicates the Laplace transformation of the variation in the control force command value $f_r(t)$. Further, $V_m(s)$ indicates the Laplace transformation of the variation in the magnetic flux command value $v_m(t)$, $I_m(s)$ indicates the Laplace transformation of the variation in the electromagnet current value $I_m(t)$, and $\phi_m(s)$ indicates the Laplace transformation of the variation in the magnetic flux $\phi_m(t)$ of the electromagnets. Further, $F_{mb}(s)$ indicates the Laplace transformation of the variation in the control force $f_{mb}(t)$ of the electromagnets, and X(s) indicates the Laplace transformation of the variation in the gap between the electromagnets and the rotor. Further, R indicates the resistance of the coils of the electromagnets, and L indicates the inductance of the electromagnets.

Here, by making the gain $K_2$ much larger than "L·s+R", the magnetic flux command value $v_m(t)$ and the control magnetic flux $\phi_m(t)$ generated from the electromagnets 104 and 105 or the electromagnets 106A and 106B are brought into one to one correspondence with each other. Further, the variation in the magnetic flux $\phi_m(t)$ is maintained in a proportional relationship with the levitating force adjusting amount $f_{mb}(t)$. Assuming that the proportional gain $K_1$ is the reciprocal of this proportional constant $K_4$, the control force command value $f_r(t)$ is brought into one to one correspondence with the levitation force adjusting amount $f_{mb}(t)$.

In this way, it is possible to minimize the error between the actual levitation force adjusting amount $f_{mb}(t)$ and the control force command value.

Next, the motor force $f_{mt}(t)$ will be examined.

As stated above, in this embodiment, the motor force $f_{mt}(t)$ is taken into consideration in calculating the acceleration of the stationary apparatus portion 600.

However, it is rather difficult to accurately ascertain this motor force $f_{mt}(t)$.

In view of this, in this embodiment, an induction motor 171 is used instead of the motor 121 using permanent electromagnets. During the period in which the rotor position sensors 107, 108, and 109 perform position detection on the rotor 103 and in which the acceleration of the stationary apparatus portion 600 is calculated, the induction motor 171 is kept in a non-energized state, whereby the influence of the motor force $f_{mt}(t)$ is nullified. When, as in the case of the first embodiment, the motor 121 using permanent electromagnets is used, the influence of the magnetic flux due to the permanent electromagnets cannot be nullified, so that it is necessary to always take the influence of the motor force $f_{mt}(t)$ into consideration.

It is desirable that the period in which the induction motor 171 is kept in the non-energized state be determined as follows. For example, when the turbo-molecular pump main body 150 is used in an apparatus like an electron microscope, the period of time in which image taking is performed by the electron microscope, that is, the period of time in which the restraint of vibration is most desired, is several seconds or so. Thus, approximately several tens of seconds to one minute suffices as the period of time in which the induction motor 171 is kept in the non-energized state.

During this period, no torque is imparted to the rotor 103 from the induction motor 171, so that a reduction in the speed of the rotor 103 can constitute a problem. However, the rotor 103 has a large moment of inertia, so that no great reduction in rotation speed occurs in period of time of several tens of seconds to one minute or so. Further, assuming that gas evacuation has been sufficiently effected in the chamber 300 before image taking is performed, it is scarcely possible that a reduction in rotation speed due to gas load should occur during this period. Thus, during the period in which the position of the rotor 103 is detected and in which the acceleration of the stationary apparatus portion 600 is calculated, no problem could be caused by bringing the induction motor 171 into the non-energized state.

Thus, by bringing the induction motor 171 into the non-energized state during the period in which vibration restraint is effected on the apparatus system, it is possible to calculate the acceleration of the stationary apparatus portion 600 by Equation 8 with the motor force $f_{mt}(t)$ nullified.

Subsequently, the unbalance force $u_b(\omega t)$ will be examined.

As stated above, by forming the observer, the unbalance force $u_b(\omega t)$ can be estimated from the magnetic bearing levitating force adjusting amount and information on rotor displacement output from the rotor position sensors.

However, the calculation based on this observer theory may be rather complicated.

On the other hand, the unbalance force $u_b(\omega t)$ is approximated to a sine wave the angular velocity of which is the rotation angular velocity $\omega$ of the rotor 103. Thus, even if the acceleration of the stationary apparatus portion 600 is calculated with the unbalance force $u_b(\omega t)$ assumed to be zero, the calculation error involved is restricted to the frequency of the rotation angular velocity $\omega$ of the rotor 103, and, in the other frequency bands, the acceleration of the stationary apparatus portion 600 can be calculated accurately. Further, the run-out of the rotor 103 due to this unbalance force $u_b(\omega t)$ is also restricted to the frequency of the rotation angular velocity ω.

Thus, by passing the calculation result of the acceleration of the stationary apparatus portion 600 with the induction motor 171 in the non-energized state through a rotation frequency follow-up type notch filter 806, there is no need to take into consideration the calculation result around the frequency of the rotation angular velocity ω of the rotor 103. This leads to generation of a dead band around the frequency of the rotation angular velocity ω of the rotor 103. However, in the other frequency bands, it is possible to accurately calculate the acceleration of the stationary apparatus portion 600.

Here, the principle on which the rotation frequency follow-up type notch filter 806 is based will be described in detail.

First, the run-out $x_d$ of the rotor 103 with respect to the stationary apparatus portion 600 can be expressed by Equation 9 through Fourier expansion.

$$x_d = x_r - x_s \quad \text{[Equation 9]}$$
$$= R_r(\omega t) + E_r - \{R_s(\omega t) + E_s\}$$
$$= A_r \sin(\omega t + \varphi_r) + E_r - \{A_s \sin(\omega t + \varphi_s) + E_s\}$$

where $R_r(\omega t)$ is the rotation frequency component (generated by the unbalance force $u_b$) of the run-out of the rotor 103; ω is the rotation angular velocity of the rotor 103; t is time; $E_r$ is the frequency component other than the rotation frequency of the run-out of the rotor 103; $R_s(\omega t)$ is the rotation frequency component of the rotor 103 of the displacement of the stationary apparatus portion 600; $A_r$ is the amplitude of $R_s(\omega t)$; $\phi_r$ is th phase of $R_r(\omega t)$; $A_s$ is the amplitude of $R_s(\omega t)$; and $\phi_s$ is the phase of $R_s(\omega t)$.

At this time, the run-out $x_d$ of the rotor 103 with respect to the stationary apparatus portion 600 is detected by the rotor position sensors 107, 108, and 109. Further, the rotation angular velocity ω of the rotor 103 is detected by the RPM sensor or the like provided on the motor 121, etc.

The following calculation is performed on the detection signal $x_d$ of the rotor 103 detected by the rotor position sensors 107, 108, and 109.

First, by multiplying the detection signal $x_d$ by $\sin(\omega t)$ and $\cos(\omega t)$, Equations 10 and 11 are obtained.

$$x_d \sin \omega t = A_r \sin(\omega t + \phi_r)\sin \omega t + E_r \sin \omega t - \{A_s \sin(\omega t + \phi_s)\sin \omega t + E_s \sin \omega t\} \quad \text{[Equation 10]}$$

$$x_d \cos \omega t = A_r \sin(\omega t + \phi_r)\cos \omega t + E_r \cos \omega t - \{A_s \sin(\omega t + \phi_s)\cos \omega t + E_s \cos \omega t\} \quad \text{[Equation 11]}$$

Further, by introducing addition theorem of trigonometric function into Equations 10 and 11, Equations 12 and 13 are obtained.

$$x_d \cdot \sin \omega t = 1/2 \cdot (A_r \cos \varphi_r - A_s \cos \varphi_s) - \quad \text{[Equation 12]}$$
$$1/2 \cdot \{A_r \cos(2\omega t + \varphi_r) + A_s \cos(2\omega t + \varphi_s)\} +$$
$$(E_r - E_s)\sin \omega t$$

$$x_d \cdot \cos \omega t = 1/2 \cdot (A_r \sin \varphi_r - A_s \sin \varphi_s) + \quad \text{[Equation 13]}$$
$$1/2 \cdot \{A_r \sin(2\omega t + \varphi_r) - A_s \sin(2\omega t + \varphi_s)\} +$$
$$(E_r - E_s)\cos \omega t$$

By passing Equations 12 and 13 through a low-pass filter whose cutoff frequency is low, the AC component is removed, whereby Equations 14 and 15 are obtained.

$$a_r = \frac{1}{2} \cdot (A_r \cos \phi_r - A_s \cos \phi_s) \quad \text{[Equation 14]}$$

$$b_r = \frac{1}{2} \cdot (A_r \sin \phi_r - A_s \sin \phi_s) \quad \text{[Equation 15]}$$

Further, $a_r$ and $b_r$ in Equations 14 and 15 are respectively multiplied by $\sin(\omega t)$ and $\cos(\omega t)$ and added together, and then amplified two fold, whereby, as shown in Equation 16, there is obtained the rotation frequency component $R_r(\omega t) - R_s(\omega t)$ of the run-out of the rotor 103 with respect to the stationary apparatus portion 600.

$$2(a_r \sin \omega t + b_r \cos \omega t) = A_r(\cos \varphi_r \cdot \sin \omega t + \sin \varphi_r \cdot \cos \omega t) - \quad \text{[Equation 16]}$$
$$A_s(\cos \varphi_s \cdot \sin \omega t + \sin \varphi_s \cdot \cos \omega t)$$
$$= A_r \sin(\omega t + \varphi_r) - A_s \sin(\omega t + \varphi_s)$$
$$= R_r(\omega t) - R_s(\omega t)$$

Further, by subtracting the rotation frequency component $R_r(\omega t) - R_s(\omega t)$ of Equation 16 from the detection signal $x_d$ of the rotor 103 obtained by the rotor position sensors 107, 108, and 109, a result signal $x_o$ is obtained as shown in Equation 17.

$$x_o = x_d - \{R_r(\omega t) - R_s(\omega t)\} \quad \text{[Equation 17]}$$
$$= R_r(\omega t) + E_r - \{R_s(\omega t) + E_s\} - \{R_r(\omega t) - R_s(\omega t)\}$$
$$= E_r - E_s$$

By outputting the result signal $x_o$ of Equation 17 to the compensator 201 of the control device 550, exclusively the frequency component $E_r - E_s$ other than the rotation frequency of the run-out of the rotor 103 with respect to the stationary apparatus portion 600 is recognized in the compensator 201.

Figure 8:
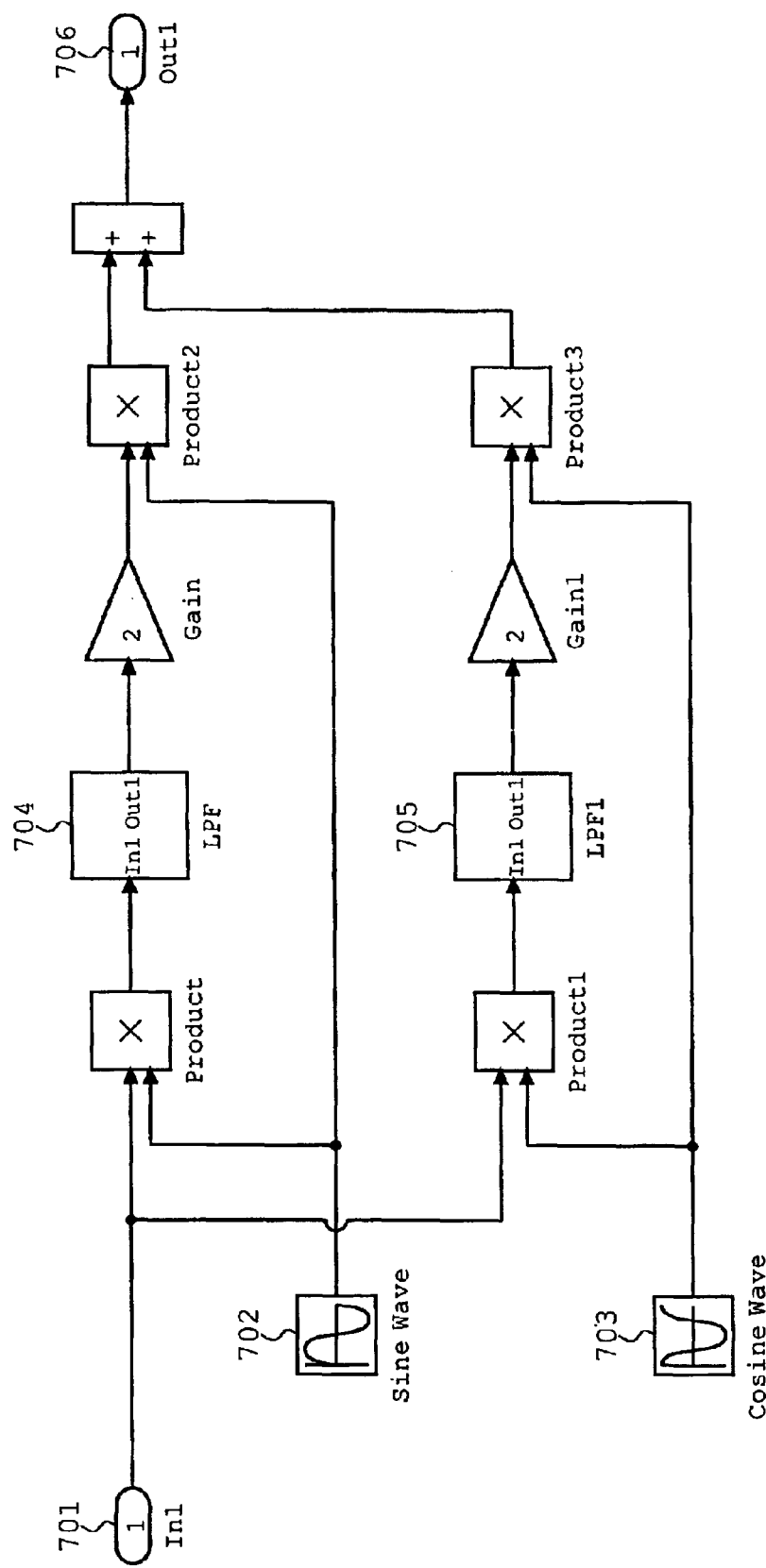
FIG. 8 is a block diagram showing the principle of a rotation frequency follow-up type notch filter.

FIG. 8 is a block diagram showing the principle of the above-described rotation frequency follow-up type notch filter 806.

In FIG. 8, an input 701 corresponds to the detection signal $x_d$ in Equations 10 and 11. Further, a sine wave 702 and a cosine wave 703 correspond to $\sin(\omega t)$ and $\cos(\omega t)$ multiplied in Equations 10 and 11. Low-pass filters 704 and 705 correspond to the low-pass filters through which Equations 12 and 13 are passed. As a result, the output 706 of FIG. 8 corresponds to the rotation frequency component $R_r(\omega t) - R_s(\omega t)$ of the displacement of the rotor 103 with respect to the stationary apparatus portion 600 calculated in Equation 16. By subtracting this output 706 from the input 701 (not shown), the result signal $x_o$ of Equation 17 is obtained.

On the basis of the above examinations on the magnetic bearing levitating force adjusting amount $f_{mb}(t)$, the motor force $f_{mt}(t)$, and the unbalance force $u_b(\omega t)$, Equation 8 for the calculation of the acceleration of the stationary apparatus portion 600 is simplified as shown in Equation 18.

$$\ddot{x}_s(t) = (1/m_r)f_{mb}(t) - \ddot{y}(t) \quad \text{[Equation 18]}$$

Assuming that the initial value is zero, Equation 18 can be expressed as shown in Equation 19 in the Laplace domain.

$$s^2 X_s(s) = (1/m_r)F_{mb}(s) - s^2 Y(s) \quad \text{[Equation 19]}$$

Here, Y(s) of the second term of the right side of Equation 19 is multiplied by a coefficient which is a square of Laplace operator s. Thus, Equation 19 is not a proper formula (That is, the degree of the Laplace operator s of the numerator is larger than the degree of the Laplace operator s of the denomiator), and, as is apparent from Equation 18, this calculation requires a secondary differentiator for performing second-order differentiation on the relative displacement y(t).

When a differentiator is required in the calculation process, the gain increases as the frequency increases, so that if an attempt is made to restrain vibration of the stationary apparatus portion 600 through feedback input of this calculation result to the vibration restraint control compensator may result in the stability of the feedback control system being impaired. Further, generally speaking, noise is often generated in a high frequency band, and tends to be amplified by this differentiator.

Thus, it is desirable for Equation 19 to be a strictly proper equation (that is, an equation in which the degree of the Laplace operator s of the numerator is smaller than the degree of the Laplace operator s of the denominator). Thus, by passing the calculation result of Equation 19 through the secondary low-pass filter, Equation 20 is obtained. In this case, $\zeta$ and $\omega_c$ are predetermined constants.

$$s^2 X_s(s) = \frac{\omega_c^2}{s^2 + 2\zeta\omega_c s + \omega_c^2} \left\{ \frac{1}{m_r} F_{mb}(s) - s^2 Y(s) \right\} \quad \text{[Equation 20]}$$

Further, by transforming Equation 20, Equation 21 is obtained.

$$s^2 X_s(s) = \frac{\omega_c^2}{s^2 + 2\zeta\omega_c s + \omega_c^2} \left\{ \frac{1}{m_r} F_{mb}(s) - \omega_c^2 Y(s) \right\} + \quad \text{[Equation 21]}$$
$$\frac{2\zeta\omega_c s}{s^2 + 2\zeta\omega_c s + \omega_c^2} \omega_c^2 Y(s) - \omega_c^2 Y(s)$$

The right side of Equation 21 is a strictly proper formula with respect to all the terms. By using this Equation 21 for the calculation of the acceleration of the stationary apparatus portion 600, it is possible to achieve an improvement in terms of stability in the feedback control system for vibration restraint and a reduction in noise.

Figure 9:
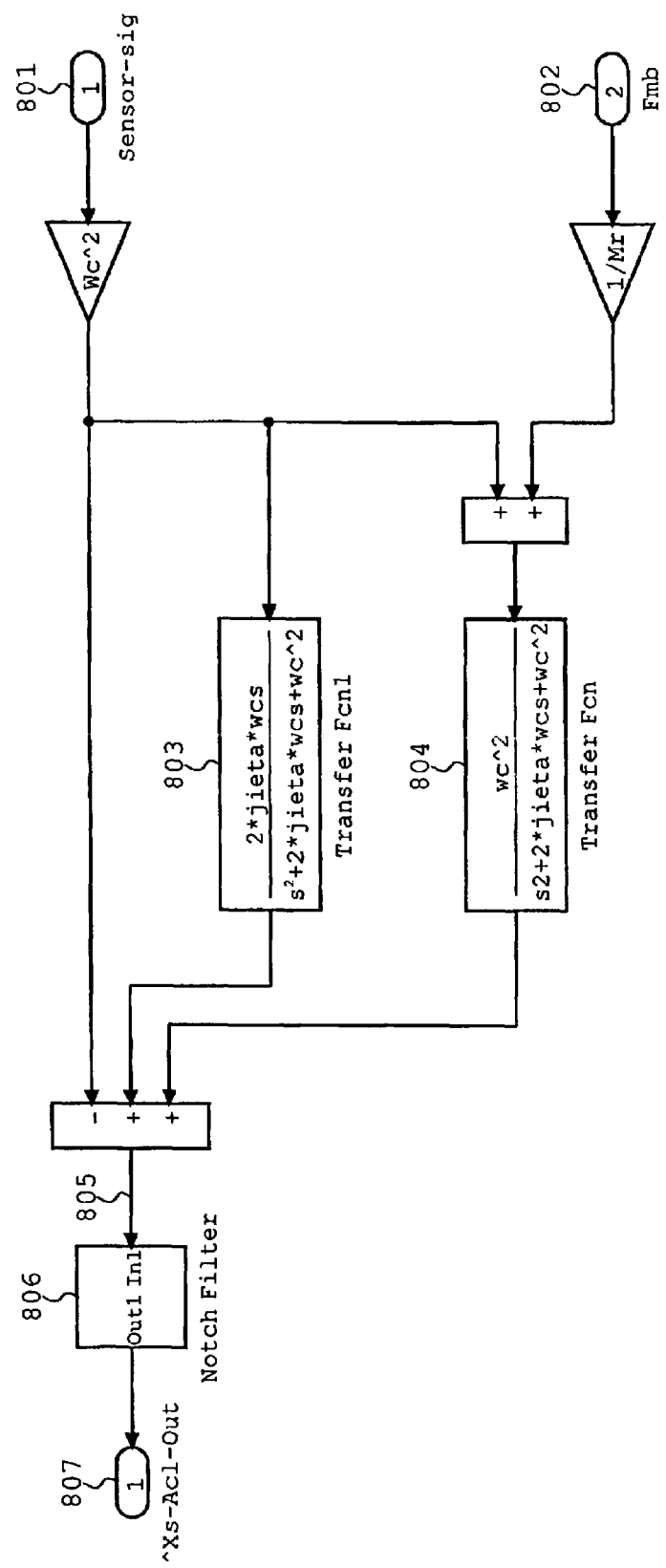
FIG. 9 is a block diagram showing a method of calculating the acceleration of a stationary apparatus portion.
Figure 10:
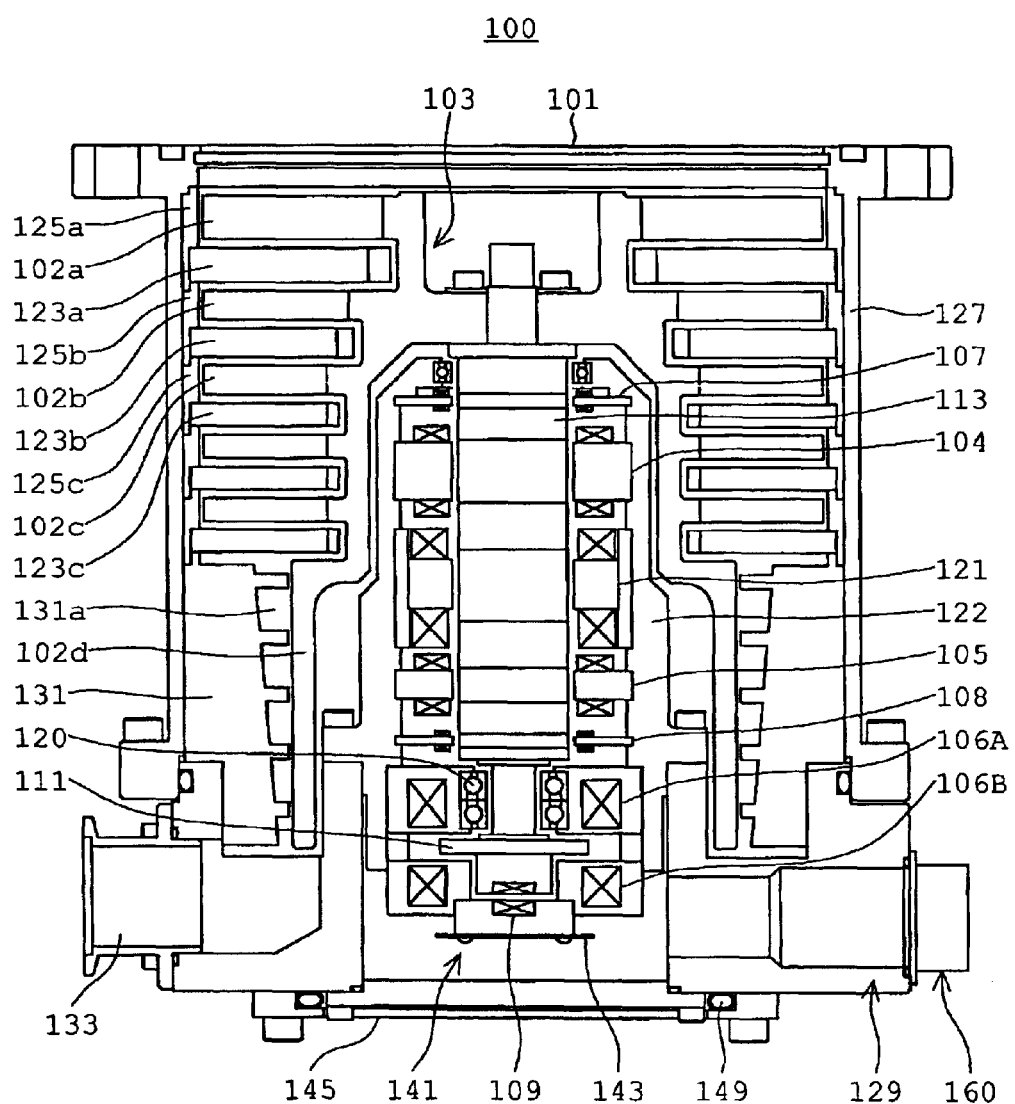
FIG. 10 is a longitudinal sectional view of a conventional turbo-molecular pump.

FIG. 9 is a block diagram showing the above method of calculating the acceleration of the stationary apparatus portion 600.

In FIG. 9, an input 801 corresponds to the Laplace transformation Y(s) of the relative displacement y(t) in Equation 21. Further, an input 802 corresponds to the Laplace transformation $F_{mb}(s)$ of the magnetic bearing levitating force adjusting amount $f_{mb}(t)$ in Equation 21. A low-pass filter 803 corresponds to the coefficient of the third and fourth terms of the right side of Equation 21, and a low-pass filter 804 corresponds to the coefficient of the first and second terms of the right side of the equation. Thus, an intermediate output 805 corresponds to the Laplace transformation $s^2 X_s(s)$ of the acceleration of the stationary apparatus portion 600 of Equation 21.

Further, by passing this intermediate output 805 through the above-described rotation frequency follow-up type notch filter 806, the output 807 of FIG. 9 corresponds to the Laplace transformation of the acceleration of the stationary apparatus portion 600 calculated in Equation 18.

Next, the operation of restraining vibration of the stationary apparatus portion 600 on the basis of the calculated acceleration of the stationary apparatus portion 600 will be described.

The vibration restraining operation of this embodiment is the same as that of the first embodiment except that control is performed on the induction motor 171 by non-energization signal from the vibration-detector/motor-controller 553.

For example, when a signal to the effect that image taking or the like is to be performed by the electron microscope in the chamber 300 is input to the vibration-detector/motor-controller 553 automatically or manually from the chamber 300 side (not shown), the vibration-detector/motor-controller 553 brings the induction motor 171 into a non-energized state on the basis of this signal.

During the period in which the induction motor 171 is in the non-energized state, the calculation of the stationary apparatus portion 600 is performed in the vibration-detector/motor-controller 553, and an acceleration signal is output to the vibration restraint control compensator 504 (The operations from this onward are the same as those in the first embodiment).

As a result, it is possible to generate a force restraining the acceleration of the stationary apparatus portion 600 in the reaction force of the levitating support force acting on the electromagnets 104, 105, 106A, and 106B, whereby it is possible to restrain vibration of the stationary apparatus portion 600.

When a signal to the effect that the image taking or the like by the electron microscope has been completed is input to the vibration-detector/motor-controller 553 from the chamber 300 side (not shown), the vibration-detector/motor-controller 553 energizes the induction motor 171 on the basis of this signal.

As a result, torque is imparted to the rotor 103 from the induction motor 171, and the magnetic bearing performs, for example, positional control that is the same as that in the prior art on the rotor 103.

In this way, instead of performing the calculation of transfer functions $F_r(s)$ and $F_a(s)$, the calculation of the acceleration of the stationary apparatus portion 600 is performed by using a magnetic bearing control force command value, etc., so that it is possible to perform calculation with high accuracy using an inexpensive computing unit.

Further, since the acceleration of the stationary apparatus portion 600 is obtained on the basis of a strictly proper formula like Equation 21, it is possible to achieve an improvement in terms of the stability of the vibration restraint feedback control system and a reduction in noise.

While in this embodiment as described above the acceleration of the stationary apparatus portion 600 is obtained from Equation 21, etc., this should not be construed restrictively. It is also possible, as in the first embodiment, to calculate a physical amount corresponding to the result obtained by differentiating or integrating the acceleration the requisite number of times, such as the addition acceleration, speed, position of the stationary apparatus portion 600.

While in the above-described embodiment the turbo-molecular pump main body 150 is fixed to the chamber 300, this should not be construed restrictively. Of course, it is most desirable for the stationary apparatus potion 600 to consist of a perfectly rigid body since that will make it possible to obtain the effect as described above. However, the chamber 300, etc. do not always consist of perfect rigid bodies.

Even in the case in which the rigidity of the chamber 300 is low, or in the construction in which the turbo-molecular pump main body 150 is fixed to the chamber 300 through the intermediation of the pump damper 301 as in the prior art, it is possible to achieve a reduction in vibration in the system having the turbo-molecular pump main body 100, 150 at its center, so that it is possible to sufficiently contribute to a reduction in vibration for the apparatus system as a whole.

Further, while in the above-described embodiment the acceleration, etc. of the stationary apparatus portion 600 corresponding to each of the rotor position sensors 107, 108, and 109 are obtained on the basis of displacement signals from these sensors to thereby control the electromagnets 104, 105, 106A, and 106B, this should not be construed restrictively.

Generally speaking, the motion of the rotor 103 is a complicated combination of motion of a translation component and motion of a rotation component. And, as has been conventionally conducted, the motion of the rotor 103 can be separated into a translation component and a rotation component from the detection results obtained by the upper radial sensor 107, the lower radial sensor 108, etc. Thus, by obtaining the acceleration, etc. of the stationary apparatus portion 600 in correspondence with each of the translation component and the rotation component of the rotor 103, it is possible to obtain the translation component and the rotation component of the acceleration, etc. of the stationary apparatus portion 600.

More specifically, the following calculations are performed. First, when obtaining the acceleration, etc. of the stationary apparatus portion 600 corresponding to the translation component, the translation component of the displacement of the rotor 103 is substituted into the relative displacement y(t) of Equation 8. When obtaining the acceleration, etc. of the stationary apparatus portion 600 corresponding to the rotation component, the rotation component of the displacement of the rotor 103 is substituted into the relative displacement y(t) of Equation 8, and the moment of inertia of the rotor 103 around its rotation center axis is substituted into the mass $m_r$ of Equation 8.

Then, from the acceleration, etc. of the stationary apparatus portion 600 corresponding to the translation component and the rotation component, which are the results of the above calculations, the control force command value, etc. for the upper radial electromagnets 104 and the lower radial electromagnets 105 are obtained again, thereby controlling the electromagnets 104 and 105.

As described above, according to the present invention, the magnetic bearing device is equipped with vibration detecting means, adding means, and vibration restraint control means, whereby it is possible to realize a reduction in vibration in the apparatus system as a whole inclusive of the equipment associated with the vacuum pump without newly providing a vibration sensor.

Further, since the magnetic bearing device is equipped with vibration detecting means, it is possible to realize vibration detection in the apparatus system as a whole inclusive of the equipment associated with the vacuum pump without newly providing a vibration sensor.

What is claimed is:

1. A magnetic bearing device with a vibration restraining function, comprising:

a rotor;

electromagnets applying a levitating force to the rotor;

a stator portion to which the electromagnets are secured;

displacement detecting means for detecting one of radial and axial relative displacement of the rotor with respect to the stator portion;

a magnetic bearing control compensator that calculates an adjusting amount of the levitating force on the basis of the relative displacement detected by the displacement detecting means;

electromagnet control means for adjusting the levitating force in accordance with a calculation result of the adjusting amount of the levitating force as obtained by the magnetic bearing control compensator;

vibration detecting means for detecting a predetermined physical amount of a stationary apparatus portion whose position relative to the stator portion is fixed; and adding means for adding an output of the vibration detecting means, with a polarity of the output reversed, to a transfer signal of magnetic bearing feedback control means formed at least by the displacement detecting means, the magnetic bearing control compensator, and the electromagnet control means, wherein the predetermined physical amount is at least one of an acceleration of the stationary apparatus portion and the stator portion, a displacement, a speed, and an addition acceleration, each of the displacement, the speed, and the addition acceleration being obtained by one of differentiating and integrating the acceleration a requisite number of times, and wherein the acceleration is a transformation result obtained through transformation of a first multiplication result into time domain, the first multiplication result being obtained by multiplying a Laplace transformation of the relative displacement of the rotor detected by the displacement detecting means by a predetermined transfer function.

2. A magnetic bearing device with a vibration restraining function according to claim 1, further comprising unbalance force detecting means for detecting or estimating an unbalance force acting on the rotor, wherein the acceleration is a transformation result obtained through transformation of an addition result into time domain, the addition result being obtained by adding to the first multiplication result a second multiplication result obtained by multiplying a Laplace transformation of a variation in the unbalance force acting on the rotor detected or estimated by the unbalance force detecting means by a reciprocal of a mass of the rotor.

3. A magnetic bearing device with a vibration restraining function according to claim 1, wherein the predetermined transfer function is expressed by a transfer function peculiar to the magnetic bearing feedback control means, the transfer function being a relationship between the relative displacement of the rotor and a force acting between the electromagnets and the rotor due to the relative displacement, and by a mass of the rotor.

4. A magnetic bearing device with a vibration restraining function according to claim 1, further comprising vibration restraint control compensating means for performing at least one of gain adjustment and/or phase compensation, PID control, and other control compensation on the output of the vibration detecting means.

5. A magnetic bearing device with a vibration restraining function according to claim 2, wherein the unbalance force detecting means is formed by an observer.

6. A pump device with a vibration restraining function, comprising a vacuum pump equipped with a magnetic bearing device as claimed in claim 1, the vacuum pump being installed in associated equipment and adapted to suck a predetermined gas from the associated equipment.

7. A pump device with a vibration restraining function according to claim 6, wherein the stationary apparatus portion includes the associated equipment, wherein the associated equipment is arranged on a floor, and wherein a damper is provided between the associated equipment and the floor.

8. A pump device with a vibration restraining function according to claim 7, wherein the rotor is equipped with a rotary blade and a rotor shaft arranged at a center of the rotary blade.

9. A magnetic bearing device with a vibration restraining function, comprising:
   a rotor;
   electromagnets applying a levitating force to the rotor;
   a stator portion to which the electromagnets are secured;
   displacement detecting means for detecting one of radial and axial relative displacement of the rotor with respect to the stator portion;
   a magnetic bearing control compensator that calculates an adjusting amount of the levitating force on the basis of the relative displacement detected by the displacement detecting means;
   electromagnet control means for adjusting the levitating force in correspondence with a calculation result of the adjusting amount of the levitating force obtained by the magnetic bearing control compensator;
   vibration detecting means for detecting a predetermined physical amount of a stationary apparatus portion whose position relative to the stator portion is fixed; and
   adding means for adding an output of the vibration detecting means, with a polarity of the output reversed, to a transfer signal of magnetic bearing feedback control means formed at least by the displacement detecting means, the magnetic bearing control compensator, and the electromagnet control means,
   wherein the predetermined physical amount is at least one of an acceleration of the stationary apparatus portion and the stator portion, a displacement, a speed, and an addition acceleration, each of the displacement, the speed, and the addition acceleration being obtained by one of differentiating and integrating the acceleration a requisite number of times, and
   wherein the acceleration is a subtraction result obtained by subtracting a result obtained by performing second-order differentiation on the relative displacement of the rotor detected by the displacement detecting means, from a third multiplication result obtained by multiplying one of the calculation result of the adjusting amount of the levitating force obtained by the magnetic bearing control compensator and an addition result obtained by the adding means by a reciprocal of a mass of the rotor.

10. A magnetic bearing device with a vibration restraining function according to claim 9, further comprising:
   an induction motor for rotating the rotor; and
   motor control means for controlling an energization state of the induction motor,
   wherein, when the predetermined physical amount is to be detected by the vibration detecting means, the motor control means brings the induction motor into a non-energized state.

11. A magnetic bearing device with a vibration restraining function according to claim 9, further comprising a rotation frequency follow-up type notch filter adapted to follow up a rotation frequency of the rotor to eliminate a frequency component of the rotation frequency,
   wherein at least one of the acceleration, the displacement, the speed, and the addition acceleration is a result obtained by passing the subtraction result through the rotation frequency follow-up type notch filter.

12. A magnetic bearing device with a vibration restraining function according to claim 9, further comprising a low-pass filter through which at least one of the acceleration, the displacement, the speed, and the addition acceleration is passed.

13. A magnetic bearing device with a vibration restraining function according to claim 9, further comprising vibration restraint control compensating means for performing at least one of gain adjustment and/or phase compensation, PID control, and other control compensation on the output of the vibration detecting means.

14. A magnetic bearing device with a vibration restraining function according to claim 9, wherein the electromagnets are opposed to each other with the rotor therebetween in a plane perpendicular to a rotation axis of the rotor, and
   wherein, in the vibration detecting means, a gain with respect to the calculation result of the adjusting amount of the levitating force obtained by the magnetic bearing control compensator is larger than what is obtained by adding a resistance of the electromagnets to the product of an inductance of the electromagnets and a Laplace operator.

15. A magnetic bearing device with a vibration restraining function according to claim 9, further comprising separating means for separating a motion of the rotor into a translation component and a rotation component based on the relative displacement detected by the displacement detecting means,
   wherein, in the vibration detecting means, the predetermined physical amount is detected in correspondence with the translation component and the rotation component obtained through separation by the separating means, and
   wherein, when the predetermined physical amount corresponding to the rotation component is to be detected, with respect to the acceleration, a moment of inertia around a rotation axis of the rotor is used for the third multiplication result instead of the mass of the rotor, and the rotation component obtained through separation by the separating means is used for the subtraction result instead of the relative displacement of the rotor detected by the displacement detecting means.

16. A magnetic bearing device with a vibration restraining function according to claim 10, wherein the vibration detecting means brings the induction motor into the non-energized state based on a signal output from the stationary apparatus portion.

17. A magnetic bearing device with a vibration restraining function according to claim 11, wherein, in the rotation frequency follow-up type notch filter:
   multiplication results are obtained by multiplying a detection signal detected by the displacement detecting means, respectively by a sine wave and a cosine wave an angular velocity of each of which is a rotation angular velocity of the rotor;
   each of the multiplication results is passed through a low-pass filter;
   each of the multiplication results is amplified twofold after being passed through the low-pass filter;
   the multiplication results are respectively multiplied by the sine wave and the cosine wave after being thus amplified;
   the multiplication results are added together to obtain an addition result; and
   the addition result is subtracted from a detection signal detected by the displacement detecting means.

18. A magnetic bearing device with a vibration restraining function according to claim 11, further comprising a low-pass filter through which at least one of the acceleration, the displacement, the speed, and the addition acceleration is passed.

19. A magnetic bearing device with a vibration restraining function according to claim 12, wherein the low-pass filter is a secondary low-pass filter.

20. A pump device with a vibration restraining function, comprising a vacuum pump equipped with a magnetic bearing device as claimed in claim 9, the vacuum pump being installed in associated equipment and adapted to suck a predetermined gas from the associated equipment.

21. A pump device with a vibration restraining function according to claim 20,
wherein the stationary apparatus portion includes the associated equipment,
wherein the associated equipment is arranged on a floor, and
wherein a damper is provided between the associated equipment and the floor.

22. A pump device with a vibration restraining function according to claim 21, wherein the rotor is equipped with a rotary blade and a rotor shaft arranged at a center of the rotary blade.

23. A magnetic bearing device with a vibration restraining function according to claim 9, further comprising magnetic flux detecting means for detecting a variation in a magnetic flux generated between the electromagnets and the rotor,
wherein a multiplication result which is obtained by using a value proportional to the variation in the magnetic flux detected by the magnetic flux detecting means instead of the calculation result of the adjusting amount of the levitating force obtained by the magnetic bearing control compensator, is used as the third multiplication result.

24. A magnetic bearing device with a vibration restraining function according to claim 23, further comprising:
an induction motor for rotating the rotor; and
motor control means for controlling an energization state of the induction motor,
wherein, when the predetermined physical amount is to be detected by the vibration detecting means, the motor control means brings the induction motor into a non-energized state.

25. A magnetic bearing device with a vibration restraining function according to claim 23, further comprising a rotation frequency follow-up type notch filter adapted to follow up a rotation frequency of the rotor to eliminate a frequency component of the rotation frequency,
wherein at least one of the acceleration, the displacement, the speed, and the addition acceleration is a result obtained by passing the subtraction result through the rotation frequency follow-up type notch filter.

26. A magnetic bearing device with a vibration restraining function according to claim 23, further comprising a low-pass filter through which at least one of the acceleration, the displacement, the speed, and the addition acceleration is passed.

27. A magnetic bearing device with a vibration restraining function according to claim 23, further comprising vibration restraint control compensating means for performing at least one of gain adjustment and/or phase compensation, PID control, and other control compensation on the output of the vibration detecting means.

28. A magnetic bearing device with a vibration restraining function according to claim 23,
wherein the electromagnets are opposed to each other with the rotor therebetween in a plane perpendicular to a rotation axis of the rotor, and
wherein, in the vibration detecting means, a gain with respect to the calculation result of the adjusting amount of the levitating force obtained by the magnetic bearing control compensator is larger than what is obtained by adding a resistance of the electromagnets to the product of an inductance of the electromagnets and a Laplace operator.

29. A magnetic bearing device with a vibration restraining function according to claim 23, further comprising separating means for separating a motion of the rotor into a translation component and a rotation component based on the relative displacement detected by the displacement detecting means,
wherein, in the vibration detecting means, the predetermined physical amount is detected in correspondence with the translation component and the rotation component obtained through separation by the separating means, and
wherein, when the predetermined physical amount corresponding to the rotation component is to be detected, with respect to the acceleration, a moment of inertia around a rotation axis of the rotor is used for the third multiplication result instead of the mass of the rotor, and the rotation component obtained through separation by the separating means is used for the subtraction result instead of the relative displacement of the rotor detected by the displacement detecting means.

30. A magnetic bearing device with a vibration restraining function according to claim 24, wherein the vibration detecting means brings the induction motor into the non-energized state based on a signal output from the stationary apparatus portion.

31. A magnetic bearing device with a vibration restraining function according to claim 25, wherein, in the rotation frequency follow-up type notch filter:
multiplication results are obtained by multiplying a detection signal detected by the displacement detecting means, respectively by a sine wave and a cosine wave an angular velocity of each of which is a rotation angular velocity of the rotor;
each of the multiplication results is passed through a low-pass filter;
each of the multiplication results is amplified twofold after being passed through the low-pass filter;
the multiplication results are respectively multiplied by the sine wave and the cosine wave after being thus amplified;
the multiplication results are added together to obtain an addition result; and
the addition result is subtracted from a detection signal detected by the displacement detecting means.

32. A magnetic bearing device with a vibration restraining function according to claim 25, further comprising a low-pass filter through which at least one of the acceleration, the displacement, the speed, and the addition acceleration is passed.

33. A magnetic bearing device with a vibration restraining function according to claim 26, wherein the low-pass filter is a secondary low-pass filter.

34. A pump device with a vibration restraining function, comprising a vacuum pump equipped with a magnetic bearing device as claimed in claim 23, the vacuum pump being installed in associated equipment and adapted to suck a predetermined gas from the associated equipment.

35. A pump device with a vibration restraining function according to claim 34,
wherein the stationary apparatus portion includes the associated equipment, wherein the associated equipment is arranged on a floor, and wherein a damper is provided between the associated equipment and the floor.

36. A pump device with a vibration restraining function according to claim 35, wherein the rotor is equipped with a rotary blade and a rotor shaft arranged at a center of the rotary blade.

37. A magnetic bearing device with a vibration estimating function, comprising:

a rotor;

electromagnets applying a levitating force to the rotor;

a stator portion to which the electromagnets are secured;

displacement detecting means for detecting one of radial and axial relative displacement of the rotor with respect to the stator portion;

a magnetic bearing control compensator that calculates an adjusting amount of the levitating force based on the displacement detected by the displacement detecting means;

electromagnet control means for adjusting the levitating force in correspondence with a calculation result of the adjusting amount of the levitating force obtained by the magnetic bearing control compensator;

vibration detecting means for detecting a predetermined physical amount of a stationary apparatus portion whose relative position with respect to the stator portion is fixed; and adding means for adding an output of the vibration detecting means, with a polarity of the output reversed, to a transfer signal of magnetic bearing feedback control means formed at least by the displacement detecting means, the magnetic bearing control compensator, and the electromagnet control means, wherein the predetermined physical amount is at least one of an acceleration of the stationary apparatus portion and the stator portion, a displacement, a speed, and an addition acceleration, each of the displacement, the speed, and the addition acceleration being obtained by one of differentiating and integrating the acceleration a requisite number of times, and wherein the acceleration is a transformation result obtained through transformation of a first multiplication result into time domain, the first multiplication result being obtained by multiplying a Laplace transformation of the relative displacement of the rotor detected by the displacement detecting means by a predetermined transfer function.

38. A pump device with a vibration estimating function, comprising a vacuum pump equipped with a magnetic bearing device as claimed in claim 37, the vacuum pump being installed in associated equipment and adapted to suck a predetermined gas from the associated equipment.

39. A magnetic bearing device with a vibration estimating function, comprising:

a rotor;

electromagnets applying a levitating force to the rotor;

a stator portion to which the electromagnets are secured;

displacement detecting means for detecting one of radial and axial relative displacement of the rotor with respect to the stator portion;

magnetic bearing control compensator that calculates an adjusting amount of the levitating force based on the displacement detected by the displacement detecting means;

electromagnet control means for adjusting the levitating force in correspondence with a calculation result of the adjusting amount of the levitating force obtained by the magnetic bearing control compensator;

vibration detecting means for detecting a predetermined physical amount of a stationary apparatus portion whose relative position with respect to the stator portion is fixed; and adding means for adding an output of the vibration detecting means, with a polarity of the output reversed, to a transfer signal of magnetic bearing feedback control means formed at least by the displacement detecting means, the magnetic bearing control compensator, and the electromagnet control means, wherein the predetermined physical amount is at least one of an acceleration of the stationary apparatus portion and the stator portion, a displacement, a speed, and an addition acceleration, each of the displacement, the speed, and the addition acceleration being obtained by one of differentiating and integrating the acceleration a requisite number of times, and wherein the acceleration is a subtraction result obtained through subtraction of a result obtained by performing second-order differentiation on the relative displacement of the rotor detected by the displacement detecting means, from a third multiplication result obtained by multiplying one of the calculation result of the adjusting amount of the levitating force obtained by the magnetic bearing control compensator and an addition result obtained by the adding means by a reciprocal of a mass of the rotor.

40. A magnetic bearing device with a vibration estimating function according to claim 39, further comprising:

an induction motor for rotating the rotor; and motor control means for controlling an energization state of the induction motor, wherein, when the predetermined physical amount is to be detected by the vibration detecting means, the motor control means brings the induction motor into a non-energized state.

41. A magnetic bearing device with a vibration estimating function according to claim 39, further comprising a rotation frequency follow-up type notch filter adapted to follow up a rotation frequency of the rotor to remove a frequency component of the rotation frequency, wherein at least one of the acceleration, the displacement, the speed, and the addition acceleration is a result obtained by passing the subtraction result through the rotation frequency follow-up type notch filter.

42. A magnetic bearing device with a vibration estimating function according to claim 39, further comprising a low-pass filter through which at least one of the acceleration, the displacement, the speed, and the addition acceleration is passed.

43. A pump device with a vibration estimating function, comprising a vacuum pump equipped with a magnetic bearing device as claimed in claim 39, the vacuum pump being installed in associated equipment and adapted to suck a predetermined gas from the associated equipment.

44. A magnetic bearing device with a vibration estimating function according to claim 39, further comprising magnetic flux detecting means for detecting a variation in a magnetic flux generated between the electromagnets and the rotor, wherein a multiplication result which is obtained by using a value proportional to the variation in the magnetic flux detected by the magnetic flux detecting means instead of the calculation result of the adjusting amount of the levitating force obtained by the magnetic bearing control compensator, is used as the multiplication result.

45. A magnetic bearing device with a vibration estimating function according to claim 44, further comprising:

an induction motor for rotating the rotor; and motor control means for controlling an energization state of the induction motor, wherein, when the predetermined physical amount is to be detected by the vibration detecting means, the motor control means brings the induction motor into a non-energized state.

46. A magnetic bearing device with a vibration estimating function according to claim 44, further comprising a rotation frequency follow-up type notch filter adapted to follow up a rotation frequency of the rotor to remove a frequency component of the rotation frequency, wherein at least one of the acceleration, the displacement, the speed, and the addition acceleration is a result obtained by passing the subtraction result through the rotation frequency follow-up type notch filter.

47. A magnetic bearing device with a vibration estimating function according to claim 44, further comprising a low-pass filter through which at least one of the acceleration, the displacement, the speed, and the addition acceleration is passed.

48. A pump device with a vibration estimating function, comprising a vacuum pump equipped with a magnetic bearing device as claimed in claim 44, the vacuum pump being installed in associated equipment and adapted to suck a predetermined gas from the associated equipment.

* * * * *